(12) United States Patent
Master Ben-Dor et al.

(10) Patent No.: US 11,640,418 B2
(45) Date of Patent: May 2, 2023

(54) PROVIDING RESPONSES TO QUERIES OF TRANSCRIPTS USING MULTIPLE INDEXES

(71) Applicant: Microsoft Technology Licensing, LLC, Redmond, WA (US)

(72) Inventors: Karen Master Ben-Dor, Kfar Saba (IL); Lili Cheng, Bellevue, WA (US); Adi Diamant, Tel Aviv (IL); Raz Halaly, Tel Aviv (IL); Eshchar Zychlinski, Tel Aviv (IL); Thomas Matthew Laird-Mcconnell, Kirkland, WA (US); Sonja Sabina Knoll, Redmond, WA (US); Daniel Dos Santos Marques, Seattle, WA (US); Shunfu Mao, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/358,598

(22) Filed: Jun. 25, 2021

(65) Prior Publication Data

US 2022/0414130 A1 Dec. 29, 2022

(51) Int. Cl.
*G06F 16/33* (2019.01)
*G06F 16/31* (2019.01)

(52) U.S. Cl.
CPC ........ *G06F 16/3344* (2019.01); *G06F 16/316* (2019.01)

(58) Field of Classification Search
CPC .................................................. G06F 16/3344
See application file for complete search history.

(56) References Cited

U.S. PATENT DOCUMENTS

| 7,496,510 B2 | 2/2009 | Frank et al. |
| 8,626,509 B2 | 1/2014 | Roy et al. |
| 9,448,992 B2 | 9/2016 | Shmiel et al. |
| 10,204,158 B2 | 2/2019 | Hay et al. |

(Continued)

FOREIGN PATENT DOCUMENTS

WO 2021011139 A1 1/2021

OTHER PUBLICATIONS

"International Search Report and Written Opinion Issued in PCT Application No. PCT/US22/029090", dated Aug. 25, 2022, 10 Pages.

*Primary Examiner* — Van H Oberly
(74) *Attorney, Agent, or Firm* — Barta, Jones & Foley, PLLC

(57) ABSTRACT

The disclosure herein describes providing responses to natural language queries associated with transcripts at least by searching multiple indexes. A transcript associated with a communication among a plurality of speakers is obtained, wherein sets of artifact sections are identified in the transcript. A set of section indexes is generated from the transcript based on artifact type definitions. A natural language query associated with the transcript is analyzed using a natural language model and query metadata of the analyzed natural language query is obtained. At least one section index of the set of section indexes is selected based on the obtained query metadata and that selected section index is searched. A response to the natural language query is provided including result data from the searched at least one search index, wherein the result data includes a reference to an artifact section referenced by the searched section index(es).

20 Claims, 7 Drawing Sheets

(56) References Cited

U.S. PATENT DOCUMENTS

| | | |
|---|---|---|
| 10,942,953 B2 | 3/2021 | Mahmoud |
| 2005/0216443 A1* | 9/2005 | Morton ................. G06F 16/435 |
| 2008/0201143 A1 | 8/2008 | Olligschlaeger et al. |
| 2015/0106091 A1 | 4/2015 | Larsen et al. |
| 2018/0160189 A1* | 6/2018 | Engineer ............ H04N 21/8133 |
| 2019/0362645 A1 | 11/2019 | Miller |
| 2020/0090661 A1 | 3/2020 | Ackerman et al. |
| 2020/0105274 A1 | 4/2020 | Joller et al. |
| 2020/0135041 A1 | 4/2020 | Arslan et al. |

* cited by examiner

PROVIDING RESPONSES TO QUERIES OF TRANSCRIPTS USING MULTIPLE INDEXES

BACKGROUND

Multi-party communications are lucrative targets for analysis. Meetings and other interactions are often recorded, and transcripts associated with such communications enable participants and/or other reviewers to better understand the content therein. However, searching such transcripts and other related files for answers to questions can prove difficult, at least because typical search engines create an index with a single schema for all documents associated with the transcript. Such limited indexing causes some questions about the content of transcripts to be difficult or impossible to answer without reviewing the entirety of the transcript or associated audio data to understand the full context of the discussion.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for providing responses to natural language queries associated with transcripts at least by searching multiple indexes is described. A transcript associated with a communication among a plurality of speakers is obtained. A plurality of sets of artifact sections is identified in the transcript, and each set of artifact sections includes artifact sections specified by an artifact type definition of a plurality of artifact type definitions. A set of section indexes is generated from the transcript based on the plurality of artifact type definitions, wherein each section index of the set of section indexes is associated with a set of artifact sections of the plurality of sets of artifact sections. A natural language query associated with the transcript is analyzed using a natural language model and query metadata of the analyzed natural language query is obtained from the natural language model. At least one section index of the set of section indexes is selected based on the obtained query metadata and that selected section index is searched based on the obtained query metadata. A response to the natural language query is provided including result data from the searched at least one search index, wherein the result data includes at least one reference to an artifact section referenced by the searched section index.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
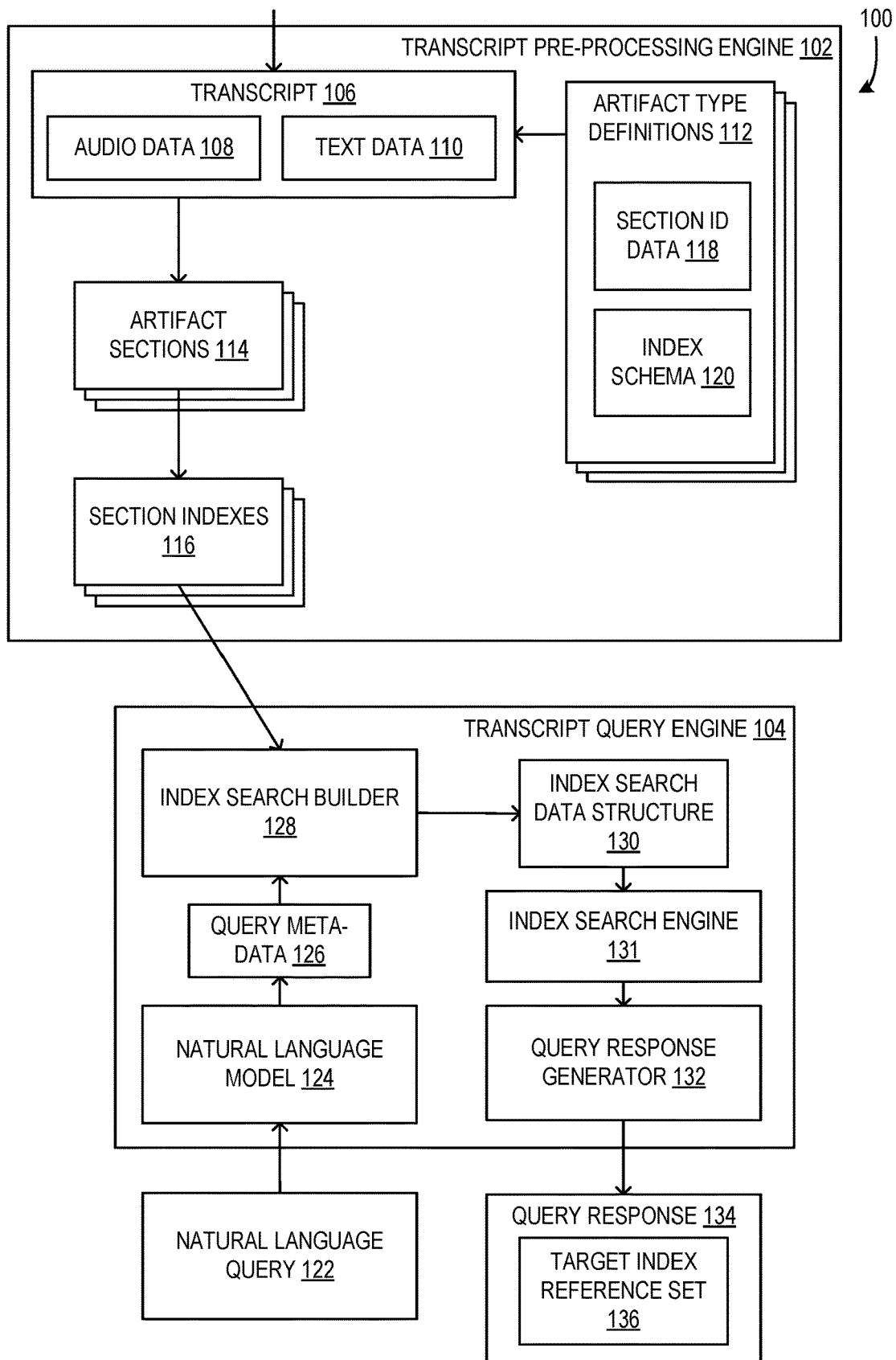
FIG. 1 is a block diagram illustrating a system configured for processing transcripts and generating responses to queries based on the processed transcripts.

Aspects of the disclosure provide a computerized method and system for providing responses to natural language queries associated with transcripts at least by searching multiple indexes. A transcript associated with a communication among a plurality of speakers is obtained by the system. Multiple types of artifact sections may be identified in the transcript, such as utterance sections, speaker-based sections, topic-based sections, or the like. For example, some artifact section are duplicative, such that a given transcript has multiple copies (e.g., one for utterance, speaker, topic, etc.).

A set of section indexes is generated from the transcript based on the different types of artifact sections, such that there is a section index for each type of artifact section. Then, when a natural language query associated with the transcript is received, the query is analyzed using a natural language model. The natural language model provides some metadata about the query (e.g., intent data and/or entity data). Section indexes of the set of section indexes are selected based on the query metadata and those selected section indexes are searched based on the query metadata. A response to the query is provided including result data such as references to artifact sections from the searched section. The use of multiple types of artifact sections of the transcript enables more diverse and flexible queries to be processed and answered accurately by the system.

The disclosure operates in an unconventional manner at least by generating multiple types of artifact section indexes for a transcript. The described systems and methods enable the use of both default defined artifacts and/or indexes and custom defined artifacts and/or indexes to configure a chatbot or other user interface to automatically respond to a wide variety of queries with accurate and complete responses. For instance, a particular query may result in the described system performing search operations on several different section indexes of the transcript based specifically on the type of query asked, and the response may be displayed to the user including a specific answer to the query and references to multiple portions of the transcript where the discussion is relevant to the answer. In this way, users of the system are provided with answers to their queries as well as supporting information for those answers, reducing or eliminating the need for a user to manually search through the transcript text and/or audio data to find those answers and/or supporting information.

Further, the disclosure enables the definition of custom defined searches and queries, enabling customers to extend the system to fit their needs. As a result, the described systems and methods are flexible and may be used in a wide variety of domains, enabling analysis of transcripts from many different types of communications or even analysis of types of data other than transcript data.

The disclosure reduces the effort required and increases the technical efficiency of a computing device when searching transcripts or the like. Additionally, when used in real-time or near-real-time during a meeting, the disclosure may reduce or eliminate interruption and repetition of discussion when participants miss crucial information. In such examples, those participants are enabled to ask about the information via the disclosed system rather than asking another participant to repeat the information.

Further, the disclosure may enable the use of a smaller, more focused natural language model (the model described herein is trained to identify specific types of queries in some examples) instead of a larger, more generalized natural language model, thereby reducing memory, processing, and other costs associated with such models. Additionally, the disclosure enables users to define custom artifact types and associated search types, enabling the efficient, specific processing of transcripts using multiple types of search indexes which may be used to reduce processing requirements for analyzing transcript data. Further, the disclosure enables a transcript and associated sections and indexes to be stored in an efficient manner, with artifact sections including metadata and references to portions of the transcript data, which may reduce data storage requirements by reducing or eliminating storage of multiple instances of the same data.

FIG. 1 is a block diagram illustrating a system 100 configured for processing transcripts 106 and generating responses to queries 122 based on the processed transcripts 106 according to an embodiment. The system 100 includes a transcript pre-processing engine 102 configured to generate section indexes 116 based on multiple artifact type definitions 112 from the transcript 106 and the system 100 includes a transcript query engine 104 configured to analyze natural language queries 122, determine section indexes 116 to search for responses, and generate query responses 134. In some examples, the system 100 is located, stored, and/or executed on a computing device such as a personal computer, server device, tablet computing device or other mobile device, or the like. For instance, a server device may be configured to execute the operations of the modules and components of the conversation summarization engine 102 as described herein.

Alternatively, in other examples, the system 100 is distributed across multiple computing devices, such that components, elements, and/or parts of the system 100 may be located and/or executed on different computing devices that are in communication with each other (e.g., via one or more communication networks, such as internal networks, the Internet, or the like). For instance, the system 100 may be configured to store data associated with operations of the transcript pre-processing engine 102 on one or more distributes storage devices and/or the system 100 may be configured to execute the operations of the modules and/or components of the transcript query engine 104 on one or more distributed computing devices (e.g., the artifact sections 114 may be identified and/or the section indexes 116 may be generated on a first server device and the query responses 134 may be generated by the transcript query engine 104 on a second server device). In other examples, other arrangements of computing devices may be used to implement the system 100 without departing from the description.

In some examples, the transcript 106 includes audio data 108 associated with a phone call or other speech-based interaction between two or more parties. Such audio data 108 may include one or more audio data channels and/or time data associated with times at which words or phrases are spoken by the parties and recorded. For instance, the audio data 108 may include a single audio data channel that includes the audio data of all parties of the interaction. Alternatively, the audio data 108 may include a separate audio data channel for each party of the interaction. In other examples, other arrangements may be used in the audio data 108 without departing from the description.

Further, the time data of the audio data 108 and/or the transcript 106 generally may include a time length of the interaction and/or timestamps association with times during the interaction that words or phrases are spoken by the parties. In some examples, such time data may be in the form of a timeline of the interaction and indicators of spoken words or phrases at associated times along the timeline. Such time data may be used to display or otherwise describe the transcript 106 with respect to relative timing of the associated interaction between the parties.

In some examples, the transcript 106 includes text data 110. Such text data 110 may be generated or otherwise determined based on a speech-to-text engine prior to the transcript pre-processing engine 102 obtaining the transcript 106 (e.g., during the associated communication or after it occurs). Alternatively, the transcript pre-processing engine 102 may be configured to include such a speech-to-text engine, such that the text data 110 is generated or otherwise determined for the transcript 106 upon the engine 102 obtaining the transcript 106 including the audio data 108. Such a speech-to-text engine may be configured to generate words, phrases, and sentences that reflect the communication represented in the audio data 108. Additionally, or alternatively, the speech-to-text engine may be configured to generate data indicative of aspects of the audio data 108 other than words spoken, such as lengths of pauses between speaking, time data associated with periods when multiple parties are speaking, time data associated with periods when the speech-to-text engine was unable to decipher the words or phrases being spoken, or the like. Further, the speech-to-text engine may be configured to determine the speaking party for each word or phrase in the audio data 108 and include data indicative of this determination in the communication transcript 106 (e.g., artifact sections 114 reflecting speaker type artifacts as defined in a speaker type artifact definition 112), such as labels for each word or phrase identifying the speaker. Such speaker sections 114 may be useful for the generation of a speaker section index 116 as described herein. In other examples, the speech-to-text engine may be configured to generate more or different types of data from the audio data 108 and/or other data associated with the transcript 106 without departing from the description herein.

In some examples, the transcripts 106 include natural language text data of the language used during a communication or interaction associated with the audio data 108, such as a telephone call, video call, instant messaging chat log, and/or other forms of conversation between two or more parties. In related examples, single-party communications, such as voice mail, may be analyzed as described herein without departing from the description. As illustrated, the transcripts 106 include audio data 108 and text data 110. In other examples, the transcripts 106 may be generated manually by a transcriptionist that listens to or otherwise observes the associated communications without departing from the description. Additionally, or alternatively, the transcripts 106 may include data indicating words and phrases used during the communication and/or other data associated with the communication, such as punctuation used, timing data associated the communication (e.g., when words are said, length of pauses between sentences, or the like), and/or other metadata associated with the communication.

In some examples, the transcript pre-processing engine 102 includes hardware, firmware, and/or software configured to use artifact type definitions 112 to delineate or otherwise identify multiple types of artifact sections 114 in the transcript 106 and then generate section indexes 116 for those multiple types of artifact sections 116. The artifact type definitions 112 include section identification data 118, or section ID data, that indicates a type of artifact in the transcript 106, such as utterance artifacts, speaker artifacts, topic artifacts, action item artifacts, keywords, topic segments (e.g., a topic name and list of associated utterances), or the like. For instance, an utterance artifact definition 112 may include section ID data 118 that indicates how the transcript pre-processing engine 102 identifies separate utterance sections 114 in the transcript 106. Such utterance sections 114 may each contain one isolated utterance (e.g., a word, phrase, sentence, or the like within the transcript 106). In another example, a speaker artifact definition may include section ID data 118 that indicates how the transcript pre-processing engine 102 identifies separate speaker sections 114 in the transcript 106 (e.g., sections of the transcript that include one or more utterances by a single speaker and which may have speaker sections associated with other speakers before and/or after). Additionally, identified sections 114 of one artifact type may include sections 114 of one or more other sections 114 of other artifact types, and/or sections 114 of one artifact type may partially overlap one or more other sections 114 of other artifact types without departing from the description. For instance, a speaker section 114 may partially overlap with a topic section 114 if the speaker changes topics of discussion midway through speaking and/or a topic section 114 may include multiple speaker sections 114 if multiple speakers participated in discussing the topic.

Section ID data 118 of the artifact type definitions 112 that indicate a process or method for delineating or otherwise identifying sections in the transcript may include artifact rules that may be evaluated, such as rules that identify boundaries between sections based on detecting length of time between words spoken, detecting sentence structure that indicates the start or end of an utterance, and/or detecting a change in speakers. Additionally, or alternatively, the data 118 of artifact type definitions 112 may include other methods of identifying artifact sections 114 in the transcript 106, such as models trained to detect and/or identify artifacts via machine learning techniques (e.g., a model trained to identify topic artifact sections 114 of a transcript).

Further, the artifact type definitions 112 may include a wide variety of types of definitions and the transcript pre-processing engine 102 may be configured for extensibility, including to receive additional custom artifact type definitions 112, such that the system 100 may be extended and customized by a third party to identify and index any type of artifact that can be defined via an artifact type definition 112. Additionally, custom artifact type definitions 112 may extend or otherwise use existing artifact type definitions 112 to identify and/or index associated artifact sections 114 (e.g., a custom artifact may be defined to include one or more utterance artifacts that have been identified based on an utterance artifact definition 112; a custom topic artifact may be defined to include one or more speaker artifact sections that have been identified based on a speaker artifact definition 112).

In some examples, the transcript pre-processing engine 102 is further configured to create or generate section indexes 116 based on the artifact sections 114 and the artifact type definitions 112. Each artifact type definition 112 may include an index schema 120 that define the format and/or content of the associated section index 116 and from which the transcript pre-processing engine 102 is enabled to generate that section index 116 using the artifact sections 114. For instance, an action item definition 112 includes an action item index schema 120 that enables the transcript pre-processing engine 102 to generate an action item section index 116 from the set of action item artifact sections 114 of the transcript 106. The artifact type definitions 112 may further include other types of data for generating the associated section indexes 116, such as any data processing method definitions, models, or the like. For instance, a custom artifact definition 112 may include a machine learning-trained model that is configured to generate a custom artifact section index 116 from a set of custom artifact sections 114.

Further, in some examples, the section indexes 116 are configured for use with one or more search engine components, such as a search engine that may be used by the transcript query engine 104 as described herein. A section index 116 may reference a "document" that includes one or more artifact sections 114 of that type. Further, the index schema 120 of the section index 116 may be configured to enable a search engine to navigate multiple documents of the section index 116 and to arrive at sections 114 of the transcript 106 that are associated with a query (e.g., data that may be a solution or response to the query being processed). For example, a section index 116 associated with utterance artifacts may include documents, with each document including one utterance from the transcript. Each utterance document may include text data of the utterance and/or reference to the utterance in the text data 110, timestamps of the beginning and/or end of the utterance in the audio data 108, and/or an identifier of the document for ease of reference. Alternatively, or additionally, a more complicated section index 116 that includes documents of topic artifact sections 114 may include references to multiple utterances in the transcript 106, text data indicating a name or other identifier of the topic of the section 114, text data indicating other keywords that may be associated with the topic, or the like.

It should be understood that, in some examples, the section indexes 116 include a wide variety of types of indexes and those indexes may or may not relate to each other. There is not necessarily a hierarchy of the section indexes 116, but it may occur (e.g., speaker sections may span a series of utterances, but action item sections may not). The schemas between indexes do overlap in some examples. For instance, documents may store pointers to one or more locations in the transcript and those locations may point to the answer to a question directly or to context used to create the answer to the question (e.g., if the answer is a summary or a derived artifact). There may not be a one-to-one mapping between query types and indexes. For instance, a particular query type may require responses based on a combination of indexes 116, such as using a speaker section index 116 to identify a speaker section that answers the query with the highest score and then using an utterance section index 116 to identify an utterance in that speaker section that has the highest score. Additionally, or alternatively, the system 100 may be configured to respond to some queries using other techniques than searching of the section indexes 116 without departing from the description (e.g., some queries may be answered using a machine learning model).

Figure 2:
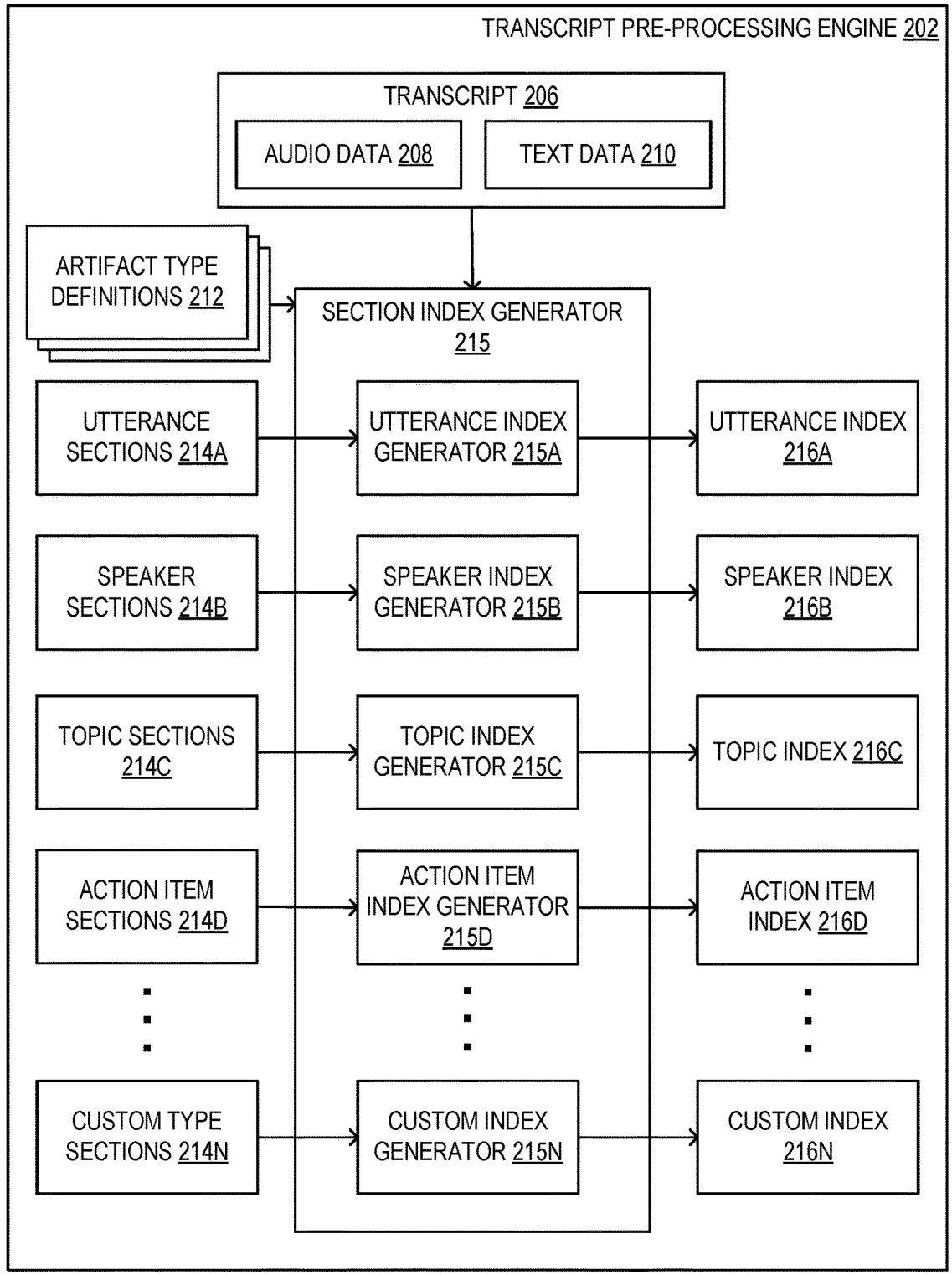
FIG. 2 is a block diagram illustrating a system configured for generating section indexes from artifact sections of various types.

FIG. 2 is a block diagram illustrating a system 200 configured for generating section indexes 216A-216N from artifact sections 214A-214N of various types according to an embodiment. In some examples, the transcript pre-processing engine 202 of the system 200 is substantially the same as the transcript pre-processing engine 102 of FIG. 1 and/or the transcript processing engine 202 is part of a system such as system 100 as described herein.

The system 200 includes a transcript pre-processing engine 202 configured to process a transcript 206, including audio data 208 and/or text data 210, to generate indexes 216A-216N. the transcript pre-processing engine 202 further includes a section index generator 215 that uses the artifact type definitions 212 and artifact sections 214A-214N of various types to generate those indexes 216A-216N. Additionally, or alternatively, the section index generator 215 is configured to include index generators 215A-215N specific to artifact types that are generated and/or configured based on artifact type definitions 212.

In some examples, the transcript pre-processing engine 202 includes utterance sections 214A associated with the transcript 206. The section index generator 215 may be configured to include an utterance index generator 215A that is configured to generate an utterance index 216A based on an artifact type definition 212 associated with utterance artifacts. Metadata of an utterance section 214A may be formatted as follows:

```
<section identifier>
{
  text: "The due date for this task is in two weeks."
  speakerref: <reference to speaker sections 214B location>
  textref: <reference to text data 210 location>
  audioref: <reference to audio data 208 location>
  audiolength: 2.5 seconds
}
```

In the above example, an utterance section 214A is identified by a section identifier, which may uniquely identify the utterance section and enable the section to be referenced during the operation of the transcript pre-processing engine 202 and/or other system components (e.g., the transcript query engine 104). The utterance section 214A further includes a 'text' field that includes the text of the associated utterance, a 'textref' field that includes a reference to the location of the utterance in the text data 210 of the transcript, an 'audioref' field that includes a reference to the location of the utterance in the audio data 208 of the transcript (e.g., the beginning of the utterance), and an 'audiolength' field that includes a time length of the utterance. Additionally, the utterance section 214A may include references to other artifact sections (e.g., other related utterance sections, other types of sections that include the utterance section, etc.). Further, the utterance section 214A may include a 'speakerref' field that includes a reference to the speaker of the utterance. In other examples, more, fewer, or different fields may be included in an utterance section 214A without departing from the description (e.g., instead of or in addition to an audio length field, the utterance section 214A may include a start time and end time of the utterance in the audio data 208).

In some examples, the utterance sections 214A include sections such as the above example section that span some or all of the transcript 206, such that a plurality of utterance sections 214A is identified in the transcript 206. The process of identifying the plurality of utterance sections 214A in the transcript 206 may be done prior to the transcript 206 being obtained by the transcript pre-processing engine 202 (e.g., during a speech-to-text process for generating the text data 210 from the audio data 208) or it may be done by the transcript pre-processing engine 202 as described herein.

In some examples, the utterance index generator 215A is configured based on the artifact type definition 212 associated with the utterance artifact type to generate an utterance index 216A based on the utterance sections 214A. For instance, the artifact type definition 212 of the utterance artifact type may include data that indicates a process for organizing and/or transforming data of the utterance sections 214A into indexed document data of an utterance index 216A. As an example, the utterance index 216A may be generated and configured to enable a search engine to perform keyword searches in the utterance sections 214A. Such an index 216A may be configured to include keywords from text data of the utterance sections 214A that are mapped or otherwise associated with references to the utterance sections 214A. Such associations in the utterance index 216A may enable a search engine to efficiently identify utterance sections 214A that include one or more keywords that are being searched. In other examples, the utterance index 216A may be configured with other arrangements or associations without departing from the description.

In some examples, the transcript pre-processing engine 202 includes speaker sections 214B associated with the transcript 206. The section index generator 215 may be configured to include a speaker index generator 215B that is configured to generate a speaker index 216B based on an artifact type definition 212 associated with speaker artifacts. Metadata of a speaker section 214B may be formatted as follows:

```
<section identifier>
{
  speakerref: <reference to speaker>
  utterances: {utterance 1, utterance 2, ... utterance N}
  textref: <reference to text data 210 location>
  audioref: <reference to audio data 208 location>
  audiolength: 2.5 seconds
}
```

In the above example, a speaker section 214B is identified by a section identifier, which may uniquely identify the speaker section and enable the section to be referenced during the operation of the transcript pre-processing engine 202 and/or other system components (e.g., the transcript query engine 104). The speaker section 214B further includes a 'speakerref' field that includes a reference to the associated speaker (e.g., such a reference may include a unique identifier and/or name of the speaker), a 'textref' field that includes a reference to the location of the utterance in the text data 210 of the transcript, an 'audioref' field that includes a reference to the location of the utterance in the audio data 208 of the transcript (e.g., the beginning of the first utterance), and an 'audiolength' field that includes a time length of the speaker section. Additionally, the speaker section 214B includes an 'utterances' field that includes a list of references to utterance sections 214A of the speaker section 214B (e.g., a speaker section may include multiple utterance sections of utterances spoken by the same speaker). In other examples, more, fewer, or different fields may be included in a speaker section 214B without departing from the description (e.g., instead of or in addition to an audio length field, the speaker section 214B may include a start time and end time of the utterance in the audio data 208).

In some examples, the speaker sections 214B include sections such as the above example section that span some or all of the transcript 206, such that a plurality of speaker sections 214B is identified in the transcript. The process of identifying the plurality of speaker sections 214B in the transcript 206 may be done prior to the transcript 206 being obtained by the transcript pre-processing engine 202 (e.g., during a speech-to-text process for generating the text data 210 from the audio data 208) or it may be done by the transcript pre-processing engine 202 as described herein.

In some examples, the speaker index generator 215B is configured based on the artifact type definition 212 associated with the speaker artifact type to generate a speaker index 216B based on the speaker sections 214B. For instance, the artifact type definition 212 of the speaker artifact type may include data that indicates a process for organizing and/or transforming data of the speaker sections 214B into indexed document data of a speaker index 216B. As an example, the speaker index 216B may be generated and configured to enable a search engine to perform searches of speaker sections 214B based on a speaker name and then to perform keyword searches in the utterance sections associated with the identified speaker sections. Such an index 216B may be configured to include speaker names of the speaker sections 214B that are mapped or otherwise associated with references to the speaker sections 214B. Such associations in the speaker index 216B may enable a search engine to efficiently identify speaker sections 214B that include one or more speaker names and/or keywords that are being searched. In other examples, the speaker index 216B may be configured with other arrangements or associations without departing from the description.

In some examples, the transcript pre-processing engine 202 includes topic sections 214C associated with the transcript 206. The section index generator 215 may be configured to include a topic index generator 215C that is configured to generate a topic index 216C based on an artifact type definition 212 associated with topic artifacts. Metadata of a topic section 214C may be formatted as follows:

```
<section identifier>
{
  topic: "Project status"
  utterances: {utterance 1, utterance 2, ... utterance N}
  textref: <reference to text data 210 location>
  audioref: <reference to audio data 208 location>
  audiolength: 2.5 seconds
}
```

In the above example, a topic section 214C is identified by a section identifier, which may uniquely identify the topic section and enable the section to be referenced during the operation of the transcript pre-processing engine 202 and/or other system components (e.g., the transcript query engine 104). The topic section 214C further includes a 'topic' field that includes the name or description of the associated topic, a 'textref' field that includes a reference to the location of the utterance in the text data 210 of the transcript, an 'audioref' field that includes a reference to the location of the utterance in the audio data 208 of the transcript (e.g., the beginning of the topic discussion), and an 'audiolength' field that includes a time length of the topic discussion. Additionally, the topic section 214C includes an 'utterances' field that includes a list of references to utterance sections 214A of the topic section 214C (e.g., a speaker section may include multiple utterance sections of utterances spoken by the same speaker). Further, a topic section 214C may include non-consecutive portions of the transcript (e.g., if the topic is discussed first at one point and then revisited later after another topic is discussed), such that there may be multiple references to different times or locations in the transcript (e.g., a list or array of transcript locations associated with discussion of the topic). In other examples, more, fewer, or different fields may be included in a topic section 214C without departing from the description (e.g., instead of or in addition to an audio length field, the topic section 214C may include a start time and end time of the utterance in the audio data 208).

In some examples, the topic sections 214C include sections such as the above example section that span some or all of the transcript 206, such that a plurality of topic sections 214C is identified in the transcript 206. The process of identifying the plurality of topic sections 214A in the transcript 206 may be done prior to the transcript 206 being obtained by the transcript pre-processing engine 202 (e.g., during a speech-to-text process for generating the text data 210 from the audio data 208) or it may be done by the transcript pre-processing engine 202 as described herein. In some examples, the topic sections 214C are identified in the transcript 206 using a process defined in the artifact type definition 212 associated with topic artifacts. For instance, such an artifact type definition 212 may include or otherwise reference a machine learning-trained model that is trained to analyze transcript data to identify topic artifacts therein and/or to provide topic sections 214C of the analyzed transcript data.

Further, in some examples, the topic sections 214C are identified in the transcript 206 by identifying approximate coherent thematic portions of the communication (e.g., each section includes communication data of the communication associated with a single topic and each section may be associated with a different topic from other topic sections of the transcript 206). For instance, the system may be configured to identify each sentence in the transcript 206 and vectorize the identified sentences (e.g., using Bidirectional Encoder Representations from Transformers (BERT) techniques or the like). The sentence vectors of the transcript 206 may then be split into groups based on similarity (e.g., the groups of sentence vectors may be determined based on maximizing the accumulated weighted cosine similarity by using the textsplit implementation or the like). The resulting topic sections 214C include groups of sentences from the transcript 206 being analyzed that are grouped such that all sentences in a group are related to a particular topic. In other examples, other techniques may be used to identify sections of sentences grouped by topics in the transcripts 206 without departing from the description herein.

In some examples, the topic index generator 215C is configured based on the artifact type definition 212 associated with the topic artifact type to generate a topic index 216C based on the topic sections 214C. For instance, the artifact type definition 212 of the topic artifact type may include data that indicates a process for organizing and/or transforming data of the topic sections 214C into indexed document data of a topic index 216C. As an example, the topic index 216C may be generated and configured to enable a search engine to perform searches of topic sections 214C based on a topic name and then to perform keyword searches in the utterance sections associated with the identified topic sections. Such an index 216C may be configured to include topic names, phrases, or descriptions of the topic sections 214C that are mapped or otherwise associated with references to the topic sections 214C. Such associations in the topic index 216C may enable a search engine to efficiently identify topic sections 214C that include one or more topic names and/or keywords that are being searched. In other examples, the topic index 216C may be configured with other arrangements or associations without departing from the description.

In some examples, the transcript pre-processing engine 202 includes action item sections 214D associated with the transcript 206. The section index generator 215 may be configured to include an action item index generator 215D that is configured to generate an action item index 216D based on an artifact type definition 212 associated with action item artifacts. Metadata of an action item section 214D may be formatted as follows:

```
<section identifier>
{
    project: <project identifier>
    description: "Prepare the presentation slideshow"
    responsible party: Steve
    responsible party ref: {utterance 1}
    due date: <due date>
    due date ref: {utterance 2, utterance 3}
    utterances: {utterance 1, utterance 2, ... utterance N}
    textref: <reference to text data 210 location>
    audioref: <reference to audio data 208 location>
    audiolength: 2.5 seconds
}
```

In the above example, an action item section 214D is identified by a section identifier, which may uniquely identify the action item section and enable the section to be referenced during the operation of the transcript pre-processing engine 202 and/or other system components (e.g., the transcript query engine 104). The action item section 214D further includes a 'project' field that includes the name or description of the project with which the action item is associated, a 'description' field that includes a word or phrase that describes the action item, a 'responsible party' field that indicates the person who is responsible for completing the action item, a 'responsible party ref' field that includes a reference to one or more utterance sections 214A from which the responsible party was determined, a 'due date' field that indicates a date and/or time at which the action item is due, a 'due date ref' field that includes a reference to one or more utterance sections 214A from which the due date was determined, an 'utterances' field that includes a list of references to utterance sections 214A of the action item section 214D, a 'textref' field that includes a reference to the location of the utterance in the text data 210 of the transcript, an 'audioref' field that includes a reference to the location of the utterance in the audio data 208 of the transcript (e.g., the beginning of the topic discussion), and an 'audiolength' field that includes a time length of the topic discussion. Further, an action item section 214D may include non-consecutive portions of the transcript (e.g., if the topic is discussed first at one point and then revisited later after another topic is discussed), such that there may be multiple references to different times or locations in the transcript (e.g., a list or array of transcript locations associated with discussion of the topic). In other examples, more, fewer, or different fields may be included in an action item section 214D without departing from the description (e.g., instead of or in addition to an audio length field, the action item section 214D may include a start time and end time of the utterance in the audio data 208).

In some examples, the action item sections 214D include sections such as the above example section that span some or all of the transcript 206, such that a plurality of action item sections 214D is identified in the transcript 206. The process of identifying the plurality of action item sections 214D in the transcript 206 may be done prior to the transcript 206 being obtained by the transcript pre-processing engine 202 (e.g., during a speech-to-text process for generating the text data 210 from the audio data 208) or it may be done by the transcript pre-processing engine 202 as described herein. In some examples, the action item sections 214D are identified in the transcript 206 using a process defined in the artifact type definition 212 associated with action item artifacts. For instance, such an artifact type definition 212 may include or otherwise reference a machine learning-trained model that is trained to analyze transcript data to identify action item artifacts therein and/or to provide action item sections 214D of the analyzed transcript data.

In some examples, the action item index generator 215D is configured based on the artifact type definition 212 associated with the action item artifact type to generate an action item index 216D based on the action item sections 214D. For instance, the artifact type definition 212 of the action item artifact type may include data that indicates a process for organizing and/or transforming data of the action item sections 214D into indexed document data of an action item index 216D. As an example, the action item index 216D may be generated and configured to enable a search engine to perform searches of action item sections 214D based on one or more fields of the sections 214D and then to perform keyword searches in the utterance sections associated with the identified action item sections. Such an index 216D may be configured to include fields of the action item sections 214D (e.g., responsible party field, project field, and/or description field) that are mapped or otherwise associated with references to the action item sections 214D. Such associations in the action item index 216D may enable a search engine to efficiently identify action item sections 214D that include one or more searched entities and/or keywords in associated fields that are being searched. In other examples, the action item index 216D may be configured with other arrangements or associations without departing from the description.

In some examples, the transcript pre-processing engine 202 is configured to enable extensibility through the inclusion of one or more custom type sections 214N (e.g., artifact sections associated with custom artifact types). The section index generator 215 may be configured to include custom index generators 215N that are configured to generate a custom indexes 216N based on artifact type definitions 212 associated with the one or more custom artifact types. The custom type sections 214N may be organized and/or formatted as defined by a creator of the custom types (e.g., first-party or third-party users may create custom artifact type definitions 212 for specialized purposes). Such custom type sections 214N may include section identifiers which may uniquely identify the custom type section and enable the section to be referenced during the operation of the transcript pre-processing engine 202 and/or other system components (e.g., the transcript query engine 104). Further, the custom type sections 214N may include data fields and/or references to utterance sections 214A or other types of artifact sections without departing from the description.

In some examples, the custom type sections 214N include sections that span some or all of the transcript 206, such that a plurality of custom type sections 214N is identified in the transcript 206. The process of identifying the plurality of custom type sections 214N in the transcript 206 may be done prior to the transcript 206 being obtained by the transcript pre-processing engine 202 (e.g., during a speech-to-text process for generating the text data 210 from the audio data 208) or it may be done by the transcript pre-processing engine 202 as described herein. In some examples, the custom type sections 214N are identified in the transcript 206 using a process defined in the artifact type definition 212 associated with the custom artifact types. For instance, such an artifact type definition 212 may include or otherwise reference a machine learning-trained model that is trained to analyze transcript data to identify artifacts of custom types therein and/or to provide custom type sections 214N of the analyzed transcript data.

In some examples, the custom index generator 215N is configured based on the artifact type definition 212 associated with the custom artifact type to generate a custom index 216N based on the custom type sections 214N. For instance, the artifact type definition 212 of the custom artifact type may include data that indicates a process for organizing and/or transforming data of the custom type sections 214N into indexed document data of a custom index 216N. As an example, the custom index 216N may be generated and configured to enable a search engine to perform searches of custom type sections 214N based on one or more fields of the sections 214N and then to perform keyword searches in the utterance sections associated with the identified custom type sections. Such an index 216N may be configured to include fields of the custom type sections 214N that are mapped or otherwise associated with references to the custom type sections 214N. Such associations in the custom index 216N may enable a search engine to efficiently identify custom type sections 214N that include one or more searched entities and/or keywords in associated fields that are being searched. In other examples, the custom index 216N may be configured with other arrangements or associations without departing from the description.

Figure 3:
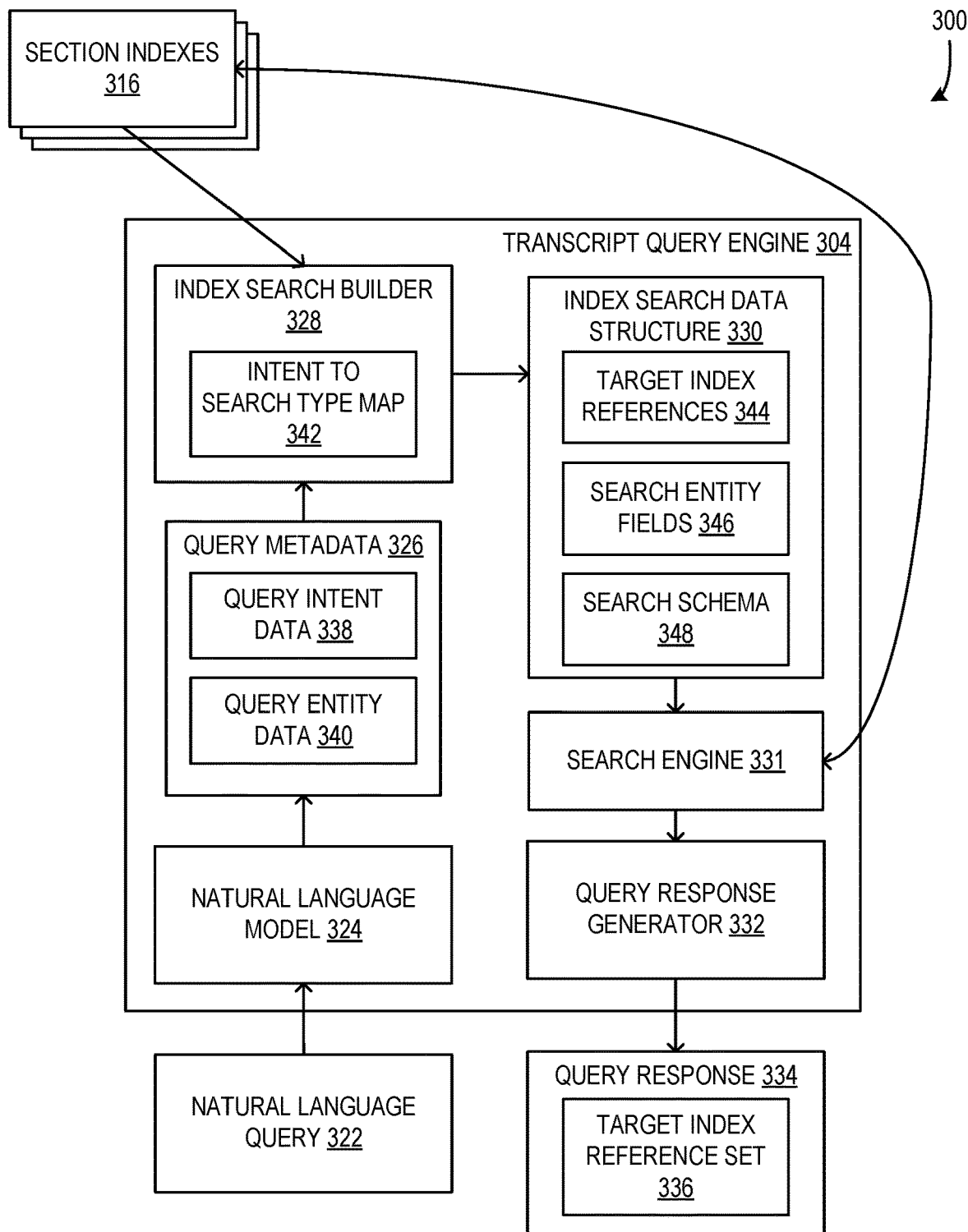
FIG. 3 is a block diagram illustrating a system configured for responding to a natural language query based on section indexes of a transcript.

Returning to FIG. 1, in some examples, the transcript query engine 104 includes hardware, firmware, and/or software for responding to a natural language query 122 with a query response 134 at least by searching one or more section indexes 116 associated with a transcript 106. The natural language query 122 may be analyzed using a natural language model 124 (e.g., a natural language understanding model) to obtain query metadata 126 (e.g., data indicating intent of the query 122 and/or data entities for use by an index search builder 128, a search engine 131, and/or a query response generator 132). For instance, intent data of the query metadata 126 may be used by the index search builder 128 to determine an index search data structure of the query 122 from the section indexes 116 and one or more data entities of the query metadata 126 may be used by the index search engine 131 to populate fields of an associated search query to be run on a target set of indexes. The query response generator 132 may be configured to use the results of the search query to generate a query response 134 that includes a target index reference set 136 (e.g., a set of references to one or more documents of the indexes of the target index set that include answers to the query 122 and/or information otherwise associated with the query response 134 to the query 122). FIG. 3 describes an example operation of the transcript query engine 104 in greater detail below.

FIG. 3 is a block diagram illustrating a system 300 configured for responding to a natural language query 322 based on section indexes 316 of a transcript (e.g., transcript 106) according to an embodiment. In some examples, the transcript query engine 304 of the system 300 is substantially the same as the transcript query engine 104 of FIG. 1 and/or the transcript query engine 304 is part of a system such as system 100 as described herein.

In some examples, the transcript query engine 304 includes a natural language model 324 configured for generating or otherwise collecting query metadata 326 from the natural language query 322, an index search builder 328 configured to build an index search data structure 330 based on the query metadata 326, a search engine 331 configured to perform a search operation on the section indexes 316 as defined by the index search data structure 330, and a query response generator 332 configured to generate a query response 334 based on results of the search operation performed by the search engine 331.

In some examples, the natural language model 324 includes hardware, firmware, and/or software configured to analyze or otherwise process the natural language query 322. The natural language query 322 may include one or more natural language sentences, such as questions asked in reference to the transcript being queried (e.g., "What did Anita say about the sales presentation?"). The natural language model 324 may be or otherwise include a model trained using machine learning techniques to process the natural language query and to output metadata 326 associated with the query 322. For instance, the natural language model 324 may be configured and/or trained to classify the natural language query 322 as including a type of query intent data 338 (e.g., the query is asking about a speaker, or the query is asking about a topic). Additionally, or alternatively, the natural language model 324 may be configured and/or trained to identify query entity data 340 that is indicative of one or more specific entities in the natural language query 322, where entities may be specific names of speakers, specific topic names or descriptions, and/or words indicating specific questions or question formats. In such examples, the query intent data 338 may be used by the transcript query engine 304 to determine a type of data to obtain for a response and/or a type or format of data with which to respond to the query. The query entity data 340 may be used by the transcript query engine 304 as specific details when identifying specific data to include in the query response 334.

In some examples, the training of the natural language model 324 includes machine learning techniques that use, for instance, a trained regressor such as a random decision forest, a directed acyclic graph, a support vector machine, a convolutional neural network or other neural network, or another trained regressor. It should further be understood that the training of the natural language model 324 may make use of training data including training natural language queries and associated query intent data and/or query entity data as training data pairs when applying machine learning techniques and/or algorithms. Millions of training data pairs may be stored in a machine learning data structure (e.g., of the system 300) for use in training the natural language model 324.

Additionally, the training data used may be selected to train the natural language model 324 to generate query metadata 326 that focus on various different types of questions in the natural language query 322. For instance, the training data may include some training queries that ask questions about things that specific speakers say that are associated with a "speaker query" intent type and other training queries that ask questions about things that specific speakers say on specific topics associated with a "speaker-topic query" intent type. As a result, the natural language model 324 is trained to generate query intent data 338 including different intent types based on different types of natural language queries 322.

Further, in some examples, the training of the natural language model 324 is based on the types of artifact sections and associated section indexes, including custom type sections (e.g., custom type sections 214N), that are generated during pre-processing. In examples where a custom artifact type is configured for use by the system, the configuration may include training the natural language model 324 for identification and/or classification of query intent data 338 that indicates the custom index associated with the custom artifact type should be used. For instance, if the system is configured to identify and use a custom defined "calendar event" artifact that identifies portions of the transcript in which the discussion is about an event that will occur or has occurred on a specific calendar date, the natural language model 324 may be trained with training data that includes that asking about such events in multiple ways paired with query intent data 338 indicating the associated queries are asking about calendar events and/or query entity data 340 that identify specific elements of the query that may be used in an index search as described herein (e.g., speaker names, dates or times mentioned, calendar event names or descriptions mentioned, or the like).

In some examples, the query metadata 326 output by the natural language model 324 includes query intent data 338 and query entity data 340. Additionally, or alternatively, the query metadata 326 may include more, fewer, or different types of data associated with the natural language query 322 without departing from the description. The query intent data 338 may include words or phrases indicative of the intent of the natural language query 322 (e.g., the query intent data may include a short summarizing phrase of what the query is asking about). Such intent data may be generated by the natural language model 324 based on the model 324 being trained to generate summaries or descriptions of a variety natural language queries 322.

Alternatively, or additionally, the query intent data 338 may include an intent type code or identifier value associated with a specific intent type. In such examples, intent type codes may be defined for each type of query that the natural language model 324 is trained to process, such that the natural language model 324 is configured to assign a specific intent type code to each natural language query 322. For instance, the defined intent type codes may include an intent type code for "recent speaker" queries asking about what a speaker said recently in the transcript, an intent type code for "recent topic" queries asking about what has been said recently about a topic in the transcript, an intent type code for "speaker topic" queries asking about what a speaker has said about a topic in the transcript, etc.

In some examples, the query entity data 340 includes words or phrases that identify elements in the query 322 that are specific to that query 322. For instance, in the query, "What did Anita just say about the budget report?", the identified elements may include "Anita" and "the budget report". These elements may be included in the query entity data 340 and may further be classified in the query entity data 340 (e.g., "Anita" is classified as a speaker and "the budget report" is classified as a topic about which the query is asking). Such classification may be done by the natural language model 324 based on its training.

The index search builder 328 includes hardware, firmware, and/or software configured to build an index search data structure 330 based on the query metadata 326. In some examples, the index search builder 328 includes an intent-to-search type map 342 that includes types of query intents/intent data mapped to types of searches and associated index search data structures. The intent-to-search type map 342 may map intent type codes to specific search types, such that an intent type code in the query intent data 388 is used to identify the search type to be used for a natural language query. Alternatively, or additionally, if the natural language model 324 does not generate intent type codes as part of the query intent data 338, the intent-to-search type map 342 may be configured to include one or more examples of intent data for each entry in the map (e.g., example summaries or descriptions of the intent type) and the query intent data 338 may be matched to one or more of those examples. The closest or strongest match between the query intent data 338 and the intent example(s) in an entry of the map may indicate that the associated search type is the one to use.

The search types of the intent-to-search type map 342 may include or otherwise be associated with index search data structures 330. In such examples, the structure of the index search data structure 330 is determined based on the search type to which the query intent data 338 is mapped in the map 342. In an example, an intent type of "recent speaker" maps to a "recent speaker" search type, which includes a definition for an associated index search data structure 330. The "recent speaker" index search data structure 330 may include a target index references 344 to a speaker index and an utterance index in the section indexes 316, search entity fields 346 that include a name of a speaker that is being asked about, and a search schema 348 configured to cause the search engine 331 to search the speaker index for sections associated with the speaker name of the search entity fields 346. Additionally, or alternatively, the index search structure 330 may include other data included in or associated with the query metadata 326, such as time data indicating when the query 322 was asked and/or context data associated with the query 322 (e.g., data indicating whether the query 322 was asked during or after the meeting associated with the transcript). An example representing a possible index search data structure 330 is provided below.

```
<unique search identifier>
{
  <"speaker topic" search type identifier>
  speaker name: "Anita"
  topic name: "budget report"
  topic sections = search <topic index id> for <topic name>
  speaker sections = search <speaker index id> for <speaker name> associated with <topic sections>
  return <speaker sections>
}
```

In the above index search data structure 330 example, pseudo code is used to represent the structure, but it should be understood that, in other examples, index search data structures 330 may be structured and/or formatted according to any standard without departing from the description (e.g., Extensible Markup Language (XML), JavaScript Object Notation (JSON)). The structure is identified by a unique search identifier and it includes a type identifier specific to the "speaker topic" search type, a speaker name of "Anita", and a topic name of "budget report". In other examples, the index search data structure may include a speaker reference instead of or in addition to the speaker name. These data values may be search entity fields 346 populated from the query entity data 340. The structure further includes searches on two section indexes: first, topic sections of the topic index that are associated with the topic name are searched for and identified, and second, speaker sections of the speaker index that are associated with the speaker name and that overlap with the identified topic sections are identified. Those overlapping speaker sections are provided as the output of the search. This structure may be included in the search schema 348 based on the "speaker topic" search type as identified in the index search builder 328 as described herein.

In other examples, more, fewer, or different types of searches may be used in the index search data structure 330 without departing from the description. For instance, index search data structures 330 may be defined to include search instructions that identify artifact sections that directly answer the natural language query 322 and other artifact sections that are associated with or otherwise provide context or background for those sections that directly answer the query 322.

The search engine 331 includes hardware, firmware, and/or software configured to perform searches of the section indexes 316 based on the index search data structure 330. In some examples, the search engine 331 is configured to perform search operations on one or more section indexes 316 based on instructions in the search schema 348 of the index search data structure 330. Search operations performed may include searching section indexes 316 and associated metadata for keywords or phrases and/or other search methods. Additionally, or alternatively, search operations of the search engine 331 may include application of one or more machine learning-trained models to the section indexes 316 based on the index search data structure 330, wherein such models may be trained to classify or otherwise process the data of section indexes 316 in association with search entity fields 346 of the index search data structure 330.

Further, the search engine 331 may be configured to obtain a set of results based on performed search operations. The set of results may include multiple results and each of the multiple results may be associated with a score value that indicates a likelihood that the result is the most fitting result. In some examples, providing a response to the query may include providing multiple search results and associated score values, such that a user is enabled to evaluate several possible answers. Alternatively, or additionally, the score values of the multiple results may be used by the system to filter the multiple results and present a filtered subset of the search results in the query response as described herein.

In some examples, the query response generator 332 is configured to receive or obtain search output from the search engine 331 and to generate a query response 334 that includes a target index reference set 336. In some examples, the target index reference set 336 includes references to section indexes 316 that are included in the search output from the search engine 331 (e.g., the index references may be at least part of the results of the search operations performed by the search engine 331). Further, the query response generator 332 may be configured to perform processing, formatting, or otherwise transforming the output from the search engine 331 to provide a response 334 to the query 322 that fits a context in which the query 322 was asked. For instance, the query response generator 332 may provide a short phrase or sentence response to the natural language query 322 that is derived from the search output in addition to the target index reference set 336, such that a user that asks a query 322 is provided with a short summary of the answer as well as references to the transcript enabling them to view the relevant sections from which the query response was derived. Such a query response 334 may also include formatting the search output and/or other related or derived data as text and/or audio playback of the transcript audio data depending on context in which the query 322 was made. An example user interface for providing a query response 334 to a user is described in greater detail below with respect to FIG. 4.

In some examples, the system 300 is configured to enable the use of customized search type definitions. A custom search type definition may include a mapping to a defined type of query intent data 338 and/or it may include a definition of a customized index search data structure 330. A customized index search data structure 330 may be defined such that it makes use of target index references 344 to default or otherwise established section indexes 316 and/or to section indexes associated with custom-defined artifacts as described above with respect to FIG. 2. Further, the natural language model 324 may be trained to identify or otherwise obtain custom query intent data 338 associated with a custom search type definition from natural language queries 322, enabling the system 300 to be configured by a user to make use of such custom definitions. Such a configured system 300 may then be capable of identifying question types that are based on the custom search type definition and to search indexes based on an associated custom index search data structure 330.

Figure 4:
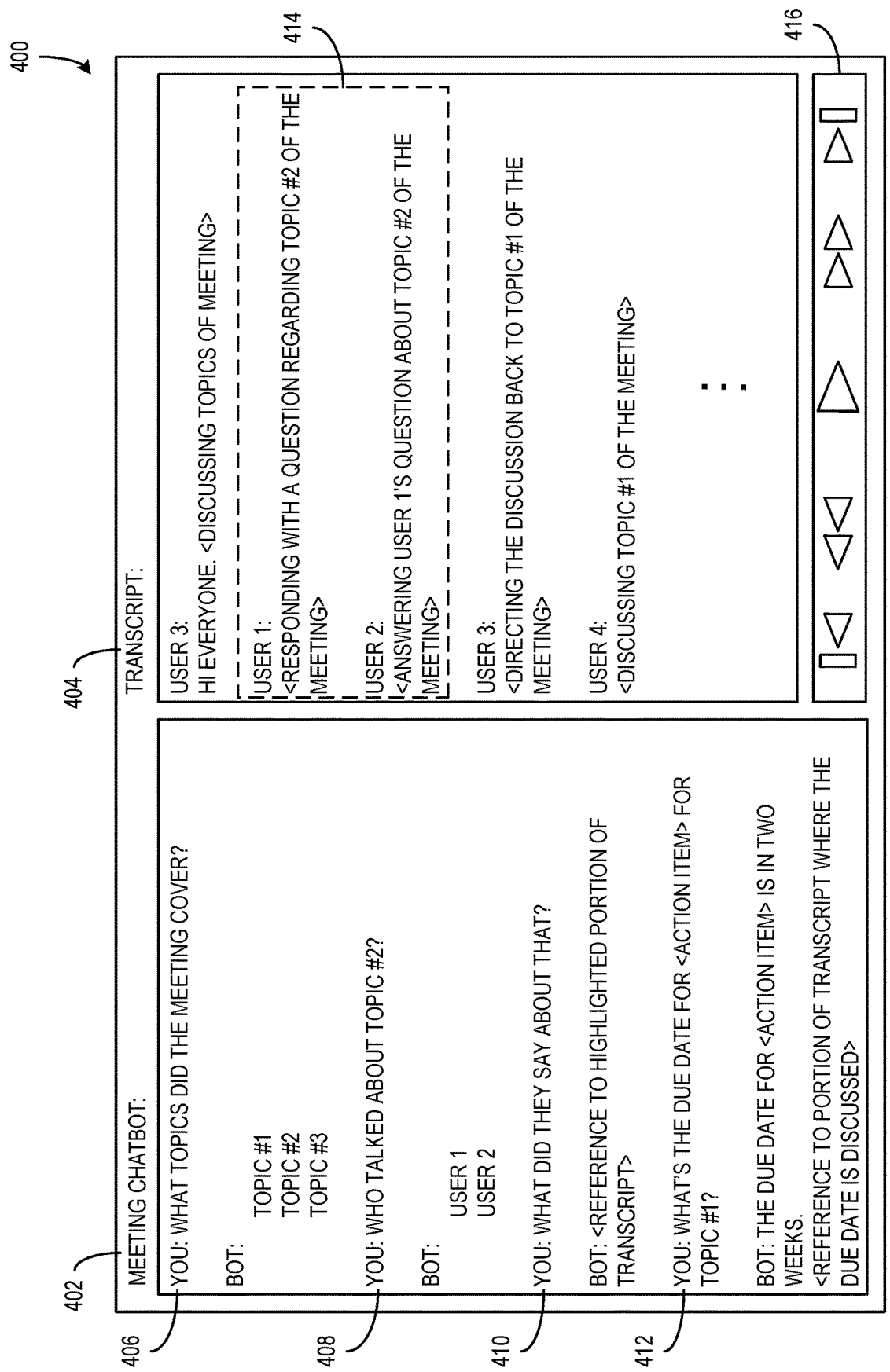
FIG. 4 is a diagram illustrating a graphical user interface (GUI) displaying a transcript and an associated chat bot.

FIG. 4 is a diagram illustrating a graphical user interface (GUI) 400 displaying a transcript 404 and an associated chatbot 402 according to an embodiment. In some examples, the GUI 400 displayed on a system such as system 100 of FIG. 1 as described herein. The GUI 400 includes a meeting chatbot 402 that enables a user of the GUI 400 to ask queries about the associated transcript displayed in a transcript section 404. The transcript section 404 is configured to display some or all of the text data of the transcript (e.g., transcript 106) to the user. Further, the transcript section 404 may be configured to display specific portions of the transcript based on questions asked to the chatbot 402 and/or based on references provided by the chatbot 402 in response to questions.

At 406, the user of the GUI 400 asks a query 406, "What topics did the meeting cover?". In response, the chatbot provides a list of topics, including topics #1, #2, and #3. It should be understood that, in real situations, the topic names may include specific descriptors of the topics, rather than identifying them by numbers as illustrated. In some examples, the query 406 is provided to the system of the GUI 400 as a natural language query and that natural language query is processed by a transcript query engine (e.g., transcript query engine 104) and the response from the chatbot 402 is based on a generate query response (e.g., query response 134) from the engine. Such processing may include a search engine searching a topic-based section index (e.g., topic index 216C) of the transcript based on an index search data structure (e.g., index search data structure 130). Such a data structure may be generated or otherwise built by an index search builder (e.g., index search builder 128) based on query metadata (e.g., query metadata 126) generated or otherwise obtained from the natural language query by a natural language model (e.g., natural language model 124). It should be understood that all queries or questions asked to the chatbot 402 may be processed in a substantially similar way, though different queries may result in the generation of index search data structures that include references to different section indexes as described herein.

As a result of the query 406, the system of the GUI 400 determines that the format of the query response should be a list of the topics included in the transcript. Such topics may be identified from the topic-based section index that has been generated from the transcript. Further, in some examples, the determination that the response should be provided as a list of topics may be based on context data and/or modality data associated with the asking of the query 406. Such data may include indications of the type of device upon which the question was asked, indications of whether the question was asked during the meeting associated with the transcript or after the meeting, or the like. Other types of context data may be used without departing from the description. For instance, if a query is asked of a chatbot and the system detects that the meeting associated with the transcript is ongoing, the system may determine that the answer should be provided only in text form to the user and that audio portions of the transcript should not be played, as that may interfere with the ongoing meeting. Alternatively, if the system determines that the meeting associated with the transcript is over and that the user is not in a meeting, the system may determine that the answer should be provided in text form as well as automatically initiating playback on the relevant portion of the transcript audio data.

After query 406 is answered by the chatbot 402, the user asks query 408, "Who talked about topic #2?". The system of the GUI 400 processes the question 408 as a natural language query as described herein and responds to the query with a list of speaker names, User 1 and User 2, who discussed topic #2 in the illustrated portion of the transcript in the transcript section 404.

The user then asks a follow up query 410, "What did they say about that?". The system of GUI 400 processes the query 408 as a natural language query as described herein and responds to the query with a reference to the portion of the transcript where User 1 and User 2 discuss topic #2. As illustrated, the query 410 uses terms that refer back to the previous query and/or answer. In some examples, the system of GUI 400 is configured to identify the use of such terms and to determine the meaning of those terms using the related query 408 and the associated query response. In the illustrated case, the system determines that "they" in query 410 means "User 1 and User 2" from the response to query 408 and that "that" in query 410 means "topic #2" from the query 408. In some examples, the language model 324 is configured to identify such coreferences when analyzing the query 408 and to resolve such coreferences using dialogue context information that is stored in memory of the system (e.g., obtaining the information from the previous query and answer combination if possible and/or look further back in the dialogue if that information is insufficient).

The reference used to respond to query 410 links to the highlighted portion 414 of the transcript section 404. In some examples, the reference is in the form of a hyperlink, button, or other interface component that, when activated, causes the highlighted portion 414 of the transcript to be displayed in the transcript section 404. Additionally, or alternatively, the highlighted portion 414 may be automatically displayed in the transcript section 404 in response to the query 410. Further, the user may be enabled to play back the audio of the highlighted portion 414 of the transcript using the audio controls 416 of the transcript section 404. Those controls may be used by the user independent of the chatbot section 402 as well, enabling the user to select a portion of the transcript section 404 and play back audio from that selected section starting at that point. The audio controls 416 may further enable the user to advance to the next section of the transcript, reverse back to the previous section of the transcript, advance to the end of the transcript, reverse back to the beginning of the transcript, or other methods of selecting audio of the transcript without departing from the description.

After the response to query 410, the user asks a query 412, "What's the due date for <action item> for topic #1?". The system of GUI 400 processes the query 412 as a natural language query as described herein and responds to the query with an answer to the query 412, "The due date for <action item> is in two weeks.", and a reference to the portion of the transcript where that due date is discussed. In some examples, based on the query 412 (e.g., the format and words used therein), the system determines that the response should include a short, direct answer to the query 412 and, for the user's convenience, a reference to the associated portion of the transcript that includes the answer to the query 412, enabling the user to easily identify and review the discussion of the due date.

In some examples, some or all answers to queries asked of the chatbot 402 include references to one or more sections or portions of the transcript that may be viewed or otherwise accessed in the transcript section 404 of the GUI 400. For instance, in response to the query 406, the list of topics may include links or other interface components that, when selected and/or activated, cause the transcript section 404 to display a section of the transcript associated with the selected topic (e.g., the first mention of the selected topic). Further, the GUI 400 may be configured to enable the user to move through the section associated with the selected topic. Such references may be used with any query (e.g., response to query 408 may include references to transcript sections associated with User 1 and/or User 2 discussing topic #2).

Additionally, portions of the audio data of the transcript, such as a highlighted portion 414, may be played to a user of the GUI 400 based on queries asked of the chatbot 402. Further, the audio playback may be configured at the system level or based on an understanding of the user query. For example, the understanding of the query may influence whether a portion of the transcript is played back in audio form or displayed to the user.

It should be understood that, in other examples, other types of responses may be generated in response to queries without departing from the description.

Figure 5:
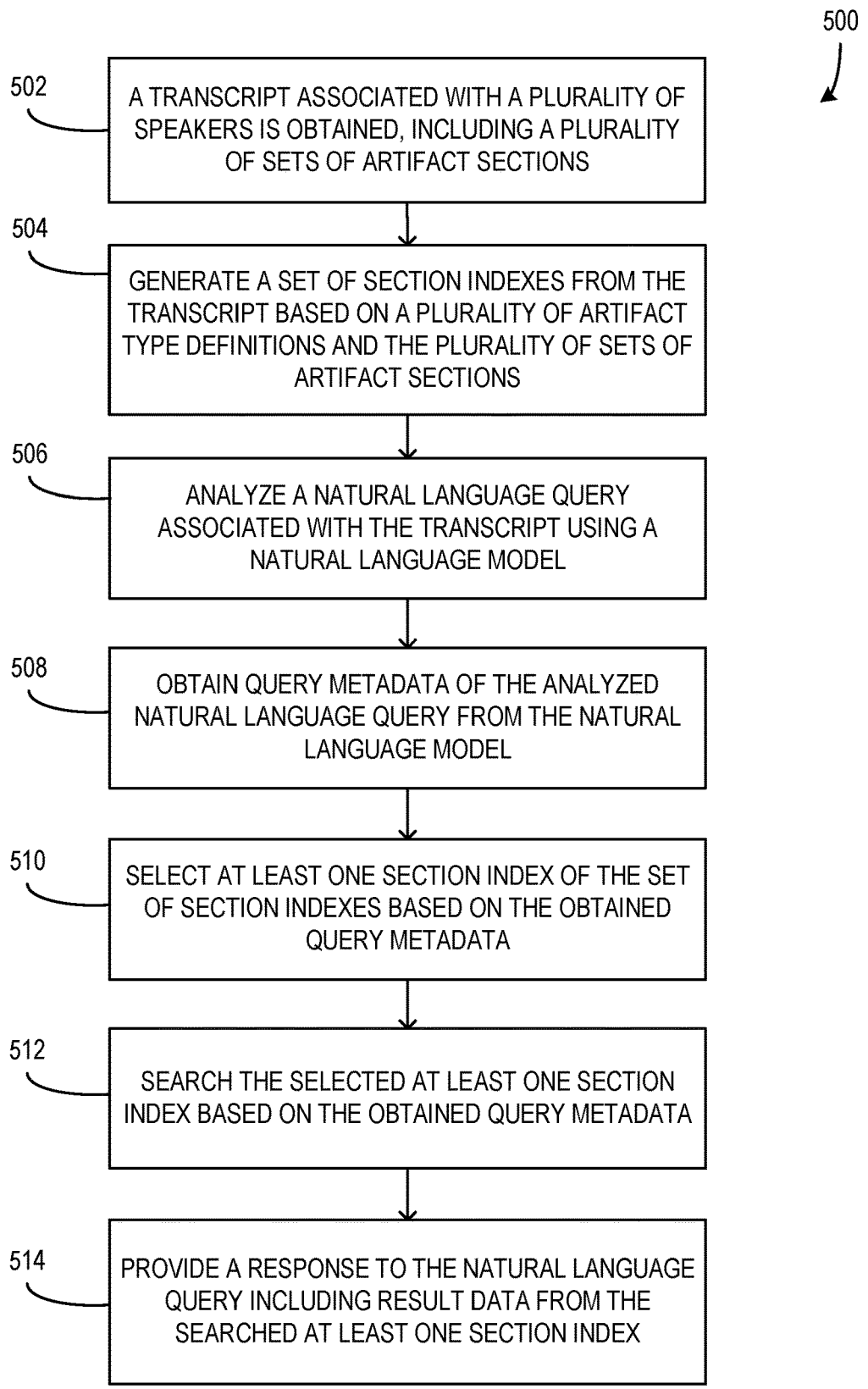
FIG. 5 is a flowchart illustrating a computerized method for providing responses to natural language queries associated with transcripts at least by searching multiple indexes.

FIG. 5 is a flowchart illustrating a computerized method 500 for providing responses (e.g., query responses 134) to natural language queries (e.g., natural language queries 122) associated with transcripts (e.g., transcripts 106) at least by searching multiple indexes (e.g., section indexes 116) according to an embodiment. In some examples, the method 500 is performed or otherwise executed on a system such as systems 100, 200, and/or 300 of FIGS. 1, 2, and 3, respectively. At 502, a transcript associated with a plurality of speakers is obtained, including a plurality of sets of artifact sections. In some examples, the plurality of sets of artifact sections includes at least one of the following: an utterance artifact section set, a speaker artifact section set, a topic artifact section set, an action item artifact section set, and a custom artifact section set. Such artifact section sets may be generated based on artifact type definitions that are specific to those artifact types, as described herein.

Additionally, or alternatively, obtaining the transcript further includes obtaining related data from other sources associated with the transcript, the related data including at least one of the following: data from a transcript related to the obtained transcript (e.g., transcripts from multiple meetings about the same or similar topics), data from an email related to the obtained transcript, and data from a document related to the obtained transcript; and wherein the plurality of sets of artifact sections includes artifact sections of the obtained related data from other sources. Such related data may be obtained from sets of related meeting transcripts (e.g., a single meeting may not be sufficiently to fully cover a particular topic or set of topics, such that follow up meetings are scheduled). Further related data may be obtained from, for instance, chat threads, chat histories, or other text-based conversation data associated with the primary transcript or meeting, email correspondence leading up to the primary meeting or otherwise referencing the primary meeting, or the like.

At 504, a set of section indexes is generated from the transcript based on a plurality of artifact type definitions and the plurality of sets of artifact sections. In some examples, each set of artifact sections is associated with one of the artifact type definitions (e.g., a set of speaker artifact sections is associated with a speaker artifact type definition). The plurality of artifact type definitions may include definitions for at least one of the following: an utterance artifact type, a speaker artifact type, a topic artifact type, an action item artifact type, and a custom artifact type. Generating the set of section indexes may include generating at least one of the following: an utterance section index, a speaker section index, a topic section index, an action item section index, and a custom section index.

At 506, a natural language query associated with the transcript is analyzed using a natural language model (e.g., natural language model 124). At 508, query metadata of the analyzed natural language query is obtained from the natural language model. In some examples, the query metadata includes intent data (e.g., query intent data 338) and/or entity data (e.g., query entity data 340).

At 510, section index of the set of section indexes is selected based on the obtained query metadata. In some examples, the selection of the section index includes mapping the intent data of the query metadata to a search type definition using an intent-to-search type map, identifying a artifact type identifier of the search type definition to which the intent data is mapped, and selecting the section index to which the identified a artifact type identifier is assigned. Additionally, or alternatively, the selection of the section index is performed by an index search builder (e.g., index search builder 328) which also uses the selected section index and an associated search type definition to build an index search data structure (e.g., index search data structure 330).

At 512, the selected section index is searched based on the obtained query metadata. In some examples, the searching of the selected section index is performed by a search engine (e.g., search engine 131) and is based on an index search data structure that includes target index references (e.g., target index references 344) to the selected section index and search entity fields (e.g., search entity fields 346) that are populated with entity data of the query metadata. The index search data structure may be formatted according to a search schema (e.g., search schema 348) based on a search type definition as described herein.

At 514, a response to the natural language query is provided, the response including result data from the searched section index. In some examples, the result data includes at least one reference to an artifact section of the transcript referenced by the searched section index. In some examples, providing the response to the natural language query includes displaying or otherwise providing the response to a user via a GUI (e.g., GUI 400) as described herein. Such displaying may include at least one of the following: displaying an answer to the natural language query associated with the artifact section referenced by the searched section index, displaying text data of an artifact section associated with the artifact section referenced by the searched section index, highlighting text data of the artifact section referenced by the searched section index, and playing audio data of the artifact section referenced by the searched at least one section index.

Further, in some examples, the method 500 further comprises receiving a custom artifact type definition and a custom search type definition that includes a reference to an artifact type identifier associated with the custom artifact type definition; integrating the received custom artifact type definition with the plurality of artifact type definitions; integrating the received custom search type definition into the intent-to-search type map; wherein the plurality of sets of artifact sections of the obtained transcript includes a set of artifact sections specified by the integrated custom artifact type definition; wherein generating the set of section indexes from the transcript based on the plurality of artifact type definitions includes generating a section index based on the integrated custom artifact type definition and associated with the set of artifact sections specified by the integrated custom artifact type definition; and wherein selecting the section index includes selecting the generated section index based on the integrated custom artifact type definition.

Figure 6:
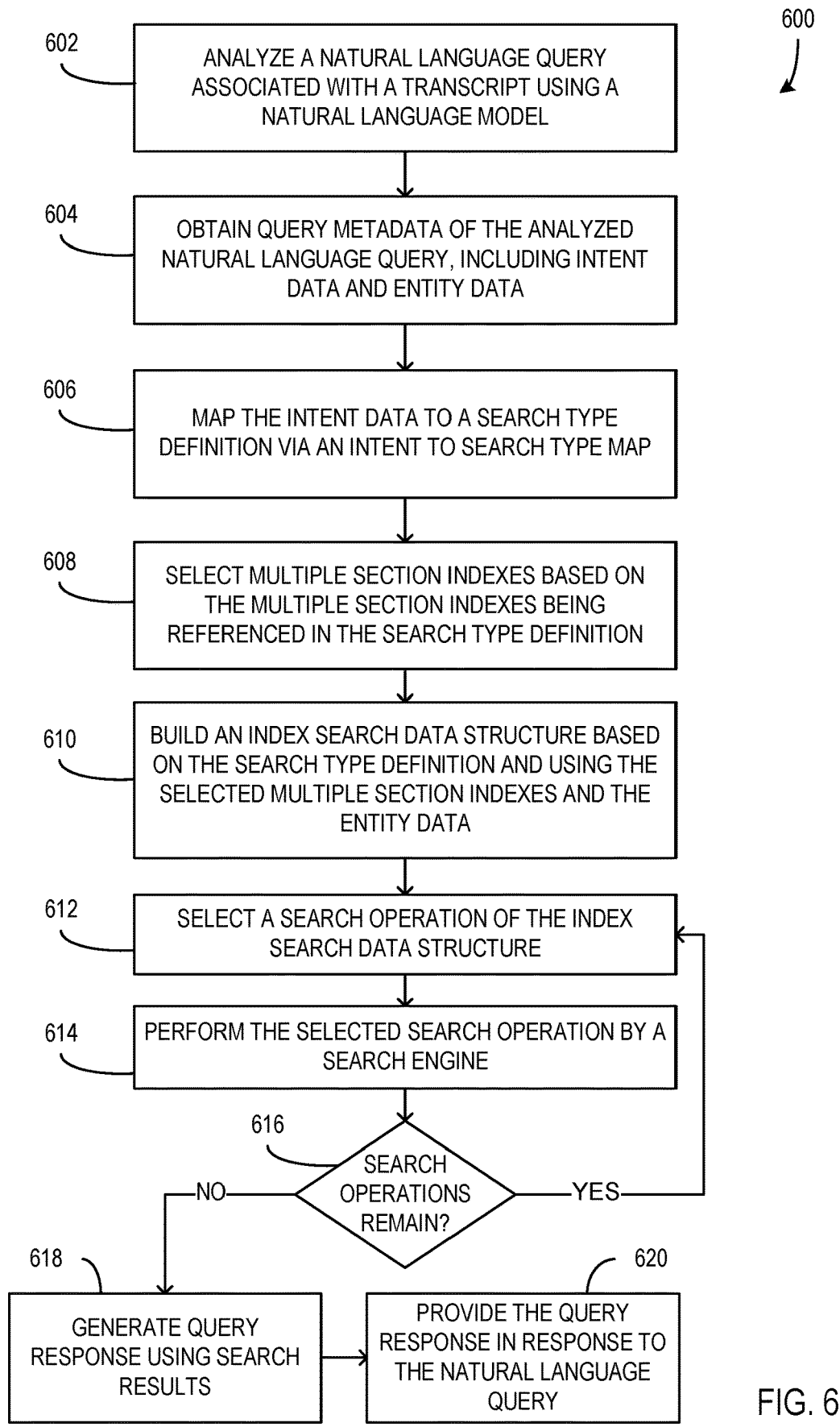
FIG. 6 is a flowchart illustrating a computerized method for providing responses to natural language queries by building and using an index search data structure associated with multiple indexes.

FIG. 6 is a flowchart illustrating a computerized method 600 for providing responses (e.g., query responses 134) to natural language queries (e.g., natural language queries 122) by building and using an index search data structure (e.g., index search data structure 330) associated with multiple indexes (e.g., section indexes 116) according to an embodiment. In some examples, the method 600 is performed or otherwise executed on a system such as systems 100, 200, and/or 300 of FIGS. 1, 2, and 3, respectively. At 602, a natural language query associated with a transcript is analyzed using a natural language model. In some examples, operations at 602 are substantially the same as those at 506 of FIG. 5, described above.

At 604, query metadata of the analyzed natural language query is obtained, the query metadata including intent data (e.g., query intent data 338) and entity data (e.g., query entity data 340). At 606, the intent data is mapped to a search type definition via an intent-to-search type map (e.g., the intent-to-search type map 342 of the index search builder 328).

At 608, multiple section indexes are selected based on those multiple section indexes being referenced in the search type definition. Further, at 610, an index search data structure based on the search type definition is built using the selected multiple section indexes and the entity data. In some examples, an index search builder performs the building of the index search data structure as described herein. Further, the search type definition is associated with the intent data and it may also be associated with one or more artifact type definitions (e.g., those of the selected multiple section indexes).

At 612, a search operation of the index search data structure is selected and, at 614, the selected search operation is performed by a search engine (e.g., search engine 331). Such a search operation may include searching one or more of the multiple section indexes based on the entity data of the query metadata (e.g., searching a speaker section index for sections associated with a particular speaker, whose name is one of the entity data values).

At 616, if search operations remain to be performed, the process returns to 612 to select another search operation of the index search data structure. Alternatively, if no search operations remain to be performed, the process proceeds to 618. In some examples, the index search data structure includes multiple search operations that are configured to be performed sequentially, enabling results for a first search operation to be used as input into a second search operation. For instance, after a set of speaker artifact sections associated with a particular speaker are identified by a first search operation, that set of speaker artifact sections may be searched for overlap with utterance artifact sections that include a keyword or phrase. In another example, the logic of searching additional indexes (e.g., based on additional machine learning models) may be more complex in that a search on one index may be performed based on a search of another index first obtaining no results or otherwise insufficient results. In other examples, other types of search operations may be performed in other orders or arrangements without departing from the description.

At 618, a query response is generated using search results of the search operations of the index search data structure. At 620, the query response is provided in response to the natural language query, as described herein.

In some examples, the described systems enable the definition of a custom artifact type based on a custom artifact definition. Such a custom artifact definition may further enable the generation and/or identification of a set of artifact sections of a transcript that represent artifacts of the custom artifact type. Further, the custom artifact definition may enable the generation of a custom section index of the set of custom type artifact sections as described herein.

Alternatively, or additionally, in some examples, the described systems enable the definition of a custom search type and/or a custom query type. A custom search type may be defined based on a custom search type definition. The custom search type definition may define intent data that maps to the custom search type (e.g., intent data that is identified based on obtaining a query of an associated custom query type). The custom search type definition may further define a custom index search data structure which defines one or more search operations to be performed on section indexes. Such a custom index search data structure may define search operations to be performed on default or otherwise non-custom section indexes, custom section indexes, or a combination thereof. Additionally, or alternatively, a natural language model of such a system may be trained based on a custom search type and/or custom query type such that the model is configured to generate or otherwise identify query metadata associated with the custom search type and/or custom query type when analyzing queries as described herein. Such a training process may require updating of the training data to include examples of the custom query type and associated query metadata, intent data, and/or entity data that should be the output of the model being trained.

Further, in some examples, the described systems enable artifact types, search types, and/or query types to be replaced or overwritten with custom versions of those types (e.g., a user may be enabled to redefine a topic artifact type to change the type of data that is used to define topic artifacts).

It should be understood that, while the systems and methods described herein are primarily applied to transcripts associated with communications between multiple speakers, in other examples, other sets of data may be processed using the systems and methods described herein. The described systems and methods may be configured to respond to queries associated with, for example, legal documents such as contracts. In such an example, contract-specific artifacts and associated indexes may be defined and contract-specific queries and associated search types may be defined, enabling users to ask queries of chatbots and receive automatically provided responses with respect to a contract document being reviewed. In other examples, other types of data may be processed using these systems and methods without departing from the description.

ADDITIONAL EXAMPLES

In an example, a user activates the described system and selects a meeting transcript to review. The system obtains the selected transcript, which has already been processed to include artifact sections associated with multiple artifact types (utterance, speaker, and topic artifacts). The system determines that the user is accessing the transcript from their personal computer and displays a GUI including the transcript to the user that is context-specific for use on a personal computer, rather than a mobile device or the like. The GUI includes a chatbot section that enables the user to ask questions about the transcript.

The user types a question to the chatbot about the transcript. The system analyzes the text of the question using a natural language model and generates or otherwise identifies metadata of the question, including intent data and specific entity data. The system then maps the intent data to a search type and builds an index search data structure associated with that search type, including the entity data in the data structure. A search engine runs search operations on artifact section indexes of the transcript based on the index search data structure and the results of the search operations are used to provide a response to the user's question on the GUI. In this case, the answer to the question is provided in text form in the chatbot window and a transcript section of the GUI displays a highlighted section of the transcript that is relevant to the answer.

In another example, the user defines a custom artifact for action items. In the definition, the user includes data and/or instructions indicating how to identify an action item artifact in a transcript and data and/or instructions indicating how an action item section index can be generated from a set of action item sections. To make use of the custom action item artifact, the user further defines a custom search type that uses an action item section index in its search operations. The user associates the custom search type with several custom query types that define different questions focused on action items in a transcript (e.g., "Who is responsible for that action item?", "What is the due date for that action item?", "What action items are discussed in this transcript?", etc.). In order to enable the system to automatically use these new custom query types and custom search type, the user defines a set of training data including the custom query types and the natural language model of the system is retrained using this newly defined set of training data, such that the model is configured to identify those custom queries and to automatically perform searches of the custom search type based on identifying those custom queries.

In another example, the system is configured to proactively respond to detection of defined states and to automatically provide query response information based on that detection. For instance, the system may be configured to detect when a user leaves their seat during a virtual meeting and to provide a response to the user when they return that includes information and references to the transcript for the time that they were away from the meeting (e.g., it may provide a summary of what was missed and/or point out sections of the transcript in which the user's name was mentioned).

In another example, the system is configured to collect data regarding queries that users are asking about a particular transcript or group of transcripts. Such "frequently asked questions" (FAQ) data may be provided to a responsible party and that party may be enabled to provide a specific answer that is used in the response to similar queries in the future. Additionally, or alternatively, sections of the transcript that are frequently included in query responses may be highlighted in a particular way for users reviewing the transcript, and those users may be able to view what questions are being asked about that particular portion, as this may reduce the likelihood that users will re-ask questions that have been answered many times.

In another example, a query asked by a user during a meeting may be forwarded to a speaker in the meeting instead of or in addition to be processed by the system as described. This way, the user can be provided with a direct answer to the question when possible. For instance, when a user asks a question about a particular topic, the question may be forwarded to a participant in the meeting that is considered the leader or expert with respect to that topic. Responses or answers provided in such situations may be added to the transcript at the appropriate point and/or the participant may be enabled to respond to such questions in real time.

In another example, a user may define a custom query type that or a specific custom question that is defined to be answered in way other than the process described herein. For instance, a user may define hard-coded responses to specific questions that come up frequently. Such questions may be identified during or prior to analysis of incoming queries by the natural language model, such that further processing may be halted and the defined answers provided to the askers of the queries.

Exemplary Operating Environment

Figure 7:
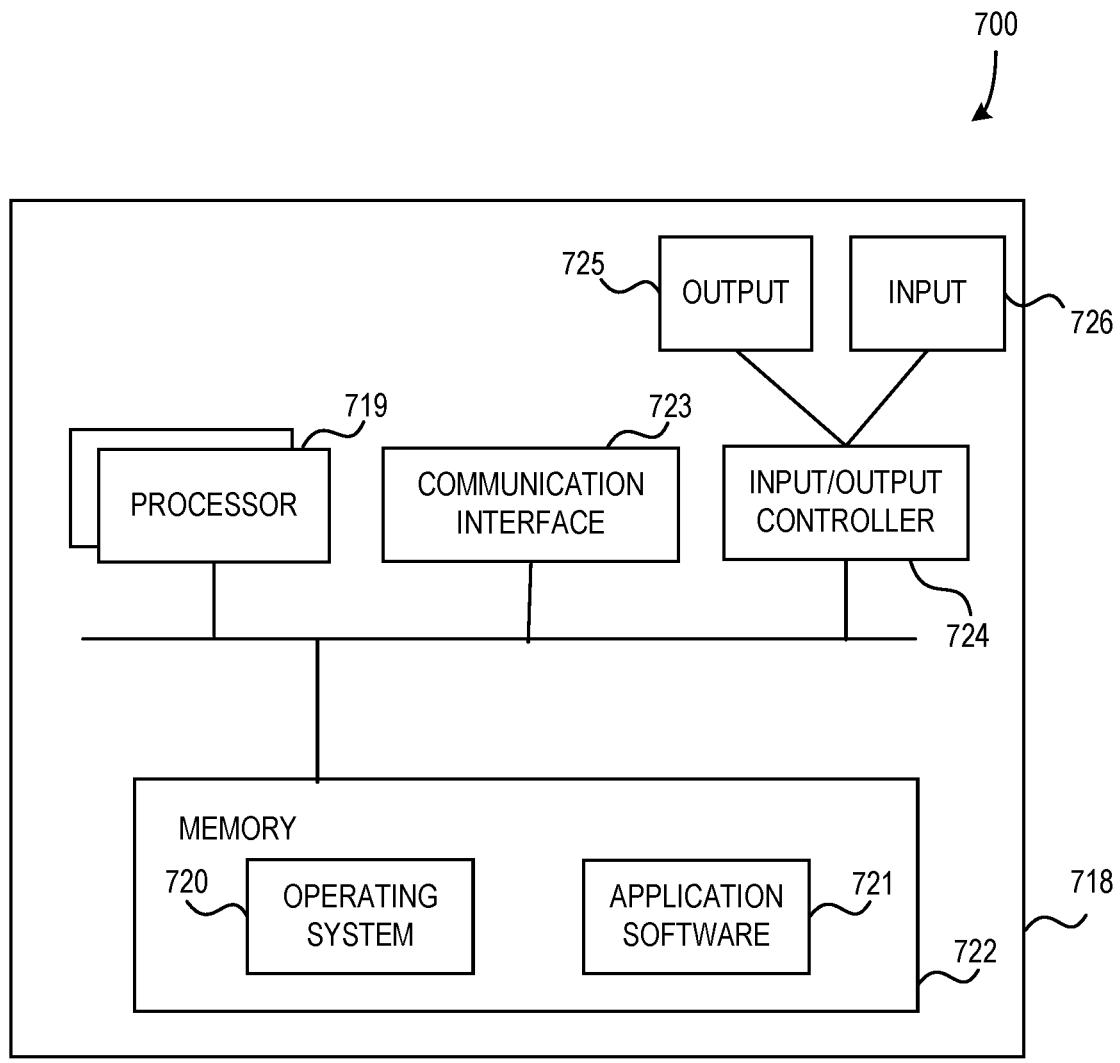
FIG. 7 illustrates an example computing apparatus as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, responding to natural language queries associated with transcripts based on multiple indexes as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g., using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g., a locally connected printing device. In some embodiments, a user may provide input to the input device(s) 726 and/or receive output from the output device (s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for providing responses to natural language queries associated with transcripts at least by searching multiple indexes comprises: at least one processor; and at least one memory comprising computer program code, the at least one memory and the computer program code configured to, with the at least one processor, cause the at least one processor to: obtain a transcript associated with a communication among a plurality of speakers, wherein a plurality of sets of artifact sections is identified in the transcript, wherein each set of artifact sections includes artifact sections specified by an artifact type definition of a plurality of artifact type definitions; generate a set of section indexes from the transcript based on the plurality of artifact type definitions, wherein each section index of the set of section indexes is associated with a set of artifact sections of the plurality of sets of artifact sections specified by an artifact type definition of the plurality of artifact type definitions; analyze a natural language query associated with the transcript using a natural language model; obtain query metadata of the analyzed natural language query from the natural language model; select section index of the set of section indexes based on the obtained query metadata; search the selected section index based on the obtained query metadata; and provide a response to the natural language query including result data from the searched section index, wherein the result data includes at least one reference to an artifact section referenced by the searched section index.

An example computerized method for providing responses to natural language queries associated with transcripts at least by searching multiple indexes comprises: analyzing, by the processor, a natural language query associated with a transcript using a natural language model; obtaining, by the processor, query metadata of the analyzed natural language query from the natural language model; selecting, by the processor, at least one section index of a set of section indexes based on the obtained query metadata, wherein the set of section indexes is associated with a plurality of sets of artifact sections identified in the transcript based on a plurality of artifact type definitions; searching, by the processor, the selected section index based on the obtained query metadata; and providing, by the processor, a response to the natural language query including result data from the searched at least one section index, wherein the result data includes at least one reference to an artifact section referenced by the searched section index.

One or more computer storage media have computer-executable instructions for providing responses to natural language queries associated with transcripts at least by searching multiple indexes, upon execution by a processor, that cause the processor to at least: obtain a transcript associated with a communication among a plurality of speakers, wherein a plurality of sets of artifact sections is identified in the transcript, wherein each set of artifact sections includes artifact sections specified by an artifact type definition of a plurality of artifact type definitions; generate a set of section indexes from the transcript based on the plurality of artifact type definitions, wherein each section index of the set of section indexes is associated with a set of artifact sections of the plurality of sets of artifact sections specified by an artifact type definition of the plurality of artifact type definitions; analyze a natural language query associated with the transcript using a natural language model; obtain query metadata of the analyzed natural language query from the natural language model; select section index of the set of section indexes based on the obtained query metadata; search the selected at least one section index based on the obtained query metadata; and provide a response to the natural language query including result data from the searched section index, wherein the result data includes at least one reference to an artifact section referenced by the searched section index.

Alternatively, or in addition to the other examples described herein, examples include any combination of the following:
wherein the plurality of artifact type definitions includes definitions for at least one of the following: an utterance artifact type, a speaker artifact type, a topic artifact type, and an action item artifact type; and wherein the set of section indexes include at least one of the following: an utterance section index, a speaker section index, a topic section index, and an action item section index.
wherein the query metadata includes intent data indicative of an intent of the analyzed natural language query; wherein each section index of the set of section indexes has an artifact type identifier of an artifact type definition by which the set of artifact sections is specified;

and wherein selecting the section index of the set of section indexes further includes: mapping the intent data of the query metadata to a search type definition using an intent-to-search type map; identifying at least one artifact type identifier of the search type definition to which the intent data is mapped; and selecting the section index having the identified at least one artifact type identifier.

wherein the query metadata includes query entity data and the search type definition includes a search schema; and wherein searching the selected section index based on the obtained query metadata includes: building an index search data structure based on the search schema; populating at least one search entity field of the index search data structure using the query entity data of the query metadata;

populating at least one target index reference of the index search data structure with at least one reference to the selected section index; and searching the at least one section index based on the index search data structure.

further comprising: receiving a custom artifact type definition and a custom search type definition that includes a reference to an artifact type identifier associated with the custom artifact type definition; integrating the received custom artifact type definition with the plurality of artifact type definitions; integrating the received custom search type definition into the intent-to-search type map; wherein the plurality of sets of artifact sections of the obtained transcript includes a set of custom artifact sections specified by the integrated custom artifact type definition; wherein generating the set of section indexes from the transcript based on the plurality of artifact type definitions includes generating a custom section index based on the integrated custom artifact type definition, wherein the generated custom section index is associated with the set of custom artifact sections specified by the integrated custom artifact type definition; and wherein selecting the section index includes selecting the generated custom section index based on the integrated custom artifact type definition.

further comprising: obtaining related data from other sources associated with the transcript, the related data including at least one of the following: data from a transcript related to the obtained transcript, data from an email related to the obtained transcript, data from a chat history related to the obtained transcript, and data from a document related to the obtained transcript; and wherein the plurality of sets of artifact sections includes artifact sections of the obtained related data from other sources.

wherein providing the response to the natural language query includes at least one of the following: displaying an answer to the natural language query associated with the artifact section referenced by the searched section index; displaying text data of an artifact section associated with the artifact section referenced by the searched section index; highlighting text data of the artifact section referenced by the searched section index; and playing audio data of the artifact section referenced by the searched section index.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by a processor, a transcript associated with a communication among a plurality of speakers, wherein a plurality of sets of artifact sections is identified in the transcript, wherein each set of artifact sections includes artifact sections specified by an artifact type definition of a plurality of artifact type definitions; exemplary means for generating, by the processor, a set of section indexes from the transcript based on the plurality of artifact type definitions, wherein each section index of the set of section indexes is associated with a set of artifact sections of the plurality of sets of artifact sections specified by an artifact type definition of the plurality of artifact type definitions; exemplary means for analyzing, by the processor, a natural language query associated with the transcript using a natural language model; exemplary means for obtaining, by the processor, query metadata of the analyzed natural language query from the natural language model; exemplary means for selecting, by the processor, section index of the set of section indexes based on the obtained query metadata; exemplary means for searching, by the processor, the selected section index based on the obtained query metadata; and exemplary means for providing, by the processor, a response to the natural language query including result data from the searched at least one section index, wherein the result data includes at least one reference to an artifact section referenced by the searched section index.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a memory comprising computer program code, the memory and the computer program code configured to, with the processor, cause the processor to:
obtain a transcript associated with a communication among a plurality of speakers, wherein a plurality of sets of artifact sections is identified in the transcript, wherein each set of artifact sections includes an artifact section specified by an artifact type definition of a plurality of artifact type definitions;
generate a set of section indexes from the transcript based on the plurality of artifact type definitions, wherein each section index of the set of section indexes is associated with a set of artifact sections of the plurality of sets of artifact sections, with a respective section index of the set of section indexes for each artifact type definition of the plurality of artifact type definitions;
analyze a natural language query associated with the transcript using a natural language model;
obtain query metadata of the analyzed natural language query from the natural language model;
select a section index of the set of section indexes based on the obtained query metadata;
search the selected section index based on the obtained query metadata; and
provide a response to the natural language query including result data from the searched section index, wherein the result data includes a reference to an artifact section referenced by the searched section index.

2. The system of claim 1, wherein the plurality of artifact type definitions includes definitions for at least one of the following: an utterance artifact type, a speaker artifact type, a topic artifact type, and an action item artifact type; and
wherein generating the set of section indexes include generating at least one of the following: an utterance section index, a speaker section index, a topic section index, and an action item section index.

3. The system of claim 1, wherein the query metadata includes intent data indicative of an intent of the analyzed natural language query;
wherein each section index of the set of section indexes has an artifact type identifier of an artifact type definition by which the set of artifact sections is specified; and
wherein selecting the section index of the set of section indexes further includes:
mapping the intent data of the query metadata to a search type definition using an intent-to-search type map;
identifying an artifact type identifier of the search type definition to which the intent data is mapped; and
selecting the section index having the identified artifact type identifier.

4. The system of claim 3, wherein the query metadata includes query entity data and the search type definition includes a search schema; and
wherein searching the selected section index based on the obtained query metadata includes:
building an index search data structure based on the search schema;
populating a search entity field of the index search data structure using the query entity data of the query metadata;
populating a target index reference of the index search data structure with a reference to the selected section index; and
searching the section index based on the index search data structure.

5. The system of claim 1, wherein the memory and the computer program code are configured to, with the processor, further cause the processor to:
receive a custom artifact type definition and a custom search type definition that includes a reference to an artifact type identifier associated with the custom artifact type definition;
integrate the received custom artifact type definition with the plurality of artifact type definitions; and
integrate the received custom search type definition into an intent-to-search type map;
wherein the plurality of sets of artifact sections of the transcript includes a set of custom artifact sections specified by the integrated custom artifact type definition;
wherein generating the set of section indexes from the transcript based on the plurality of artifact type definitions includes generating a custom section index based on the integrated custom artifact type definition, wherein the generated custom section index is associated with the set of custom artifact sections specified by the integrated custom artifact type definition; and
wherein selecting the section index includes selecting the generated custom section index based on the integrated custom artifact type definition.

6. The system of claim 1, wherein the memory and the computer program code are configured to, with the processor, further cause the processor to: obtain related data from other sources associated with the transcript, the related data including at least one of the following: data from a transcript related to the transcript, data from an email related to the transcript, data from a chat history related to the transcript, and data from a document related to the transcript; and
wherein the plurality of sets of artifact sections includes an artifact section of the obtained related data from other sources.

7. A computerized method comprising:
analyzing, by a processor, a natural language query associated with a transcript using a natural language model;

obtaining, by the processor, query metadata of the analyzed natural language query from the natural language model;

selecting, by the processor, a section index of a set of section indexes based on the obtained query metadata, wherein the set of section indexes is associated with a plurality of sets of artifact sections identified in the transcript based on a plurality of artifact type definitions, with a respective section index of the set of section indexes for each artifact type definition of the plurality of artifact type definitions;

searching, by the processor, the selected section index based on the obtained query metadata; and providing, by the processor, a response to the natural language query including result data from the searched section index, wherein the result data includes a reference to an artifact section referenced by the searched section index.

8. The computerized method of claim 7, wherein the query metadata includes intent data indicative of an intent of the analyzed natural language query;

wherein each section index of the set of section indexes has an artifact type identifier of an artifact type definition by which the set of artifact sections is specified; and wherein selecting the section index of the set of section indexes further includes:
mapping the intent data of the query metadata to a search type definition using an intent-to-search type map;
identifying an artifact type identifier of the search type definition to which the intent data is mapped; and
selecting the section index having the identified artifact type identifier.

9. The computerized method of claim 8, wherein the query metadata includes query entity data and the search type definition includes a search schema; and wherein searching the selected section index based on the obtained query metadata includes:
building an index search data structure based on the search schema;
populating a search entity field of the index search data structure using the query entity data of the query metadata;
populating a target index reference of the index search data structure with a reference to the selected section index; and
searching the section index based on the index search data structure.

10. The computerized method of claim 7, further comprising:
receiving a custom artifact type definition and a custom search type definition that includes a reference to an artifact type identifier associated with the custom artifact type definition;
integrating the received custom artifact type definition with the plurality of artifact type definitions;
integrating the received custom search type definition into an intent-to-search type map; and
wherein the plurality of sets of artifact sections of the transcript includes a set of custom artifact sections specified by the integrated custom artifact type definition;
wherein generating the set of section indexes from the transcript based on the plurality of artifact type definitions includes generating a custom section index based on the integrated custom artifact type definition, wherein the generated custom section index is associated with the set of custom artifact sections specified by the integrated custom artifact type definition; and wherein selecting the section index includes selecting the generated custom section index based on the integrated custom artifact type definition.

11. The computerized method of claim 7, wherein providing the response to the natural language query includes at least one of the following: displaying an answer to the natural language query associated with the artifact section referenced by the searched section index; displaying text data of an artifact section associated with the artifact section referenced by the searched section index, highlighting text data of the artifact section referenced by the searched section index; and playing audio data of the artifact section referenced by the searched section index.

12. A computer storage medium having computer-executable instructions that, upon execution by a processor, cause the processor to at least:

obtain a transcript associated with a communication among a plurality of speakers, wherein a plurality of sets of artifact sections is identified in the transcript, wherein each set of artifact sections includes an artifact section specified by an artifact type definition of a plurality of artifact type definitions;

generate a set of section indexes from the transcript based on the plurality of artifact type definitions, wherein each section index of the set of section indexes is associated with a set of artifact sections of the plurality of sets of artifact sections;

analyze a natural language query associated with the transcript using a natural language model;

obtain query metadata of the analyzed natural language query from the natural language model;

select a section index of the set of section indexes based on the obtained query metadata;

search the selected section index based on the obtained query metadata; and provide a response to the natural language query including result data from the searched section index, wherein the result data includes a reference to an artifact section referenced by the searched section index.

13. The computer storage medium of claim 12, wherein the plurality of artifact type definitions includes definitions for at least one of the following: an utterance artifact type, a speaker artifact type, a topic artifact type, and an action item artifact type; and wherein generating the set of section indexes include generating at least one of the following: an utterance section index, a speaker section index, a topic section index, and an action item section index.

14. The computer storage medium of claim 12, wherein the query metadata includes intent data indicative of an intent of the analyzed natural language query;

wherein each section index of the set of section indexes has an artifact type identifier of an artifact type definition by which the set of artifact sections is specified; and wherein selecting the section index of the set of section indexes further includes:
mapping the intent data of the query metadata to a search type definition using an intent-to-search type map;
identifying at least one artifact type identifier of the search type definition to which the intent data is mapped; and selecting the section index having the identified a artifact type identifier.

15. The computer storage medium of claim 14, wherein the query metadata includes query entity data and the search type definition includes a search schema; and
wherein searching the selected section index based on the obtained query metadata includes:
building an index search data structure based on the search schema;
populating a search entity field of the index search data structure using the query entity data of the query metadata;
populating a target index reference of the index search data structure with at least one reference to the selected section index; and
searching the section index based on the index search data structure.

16. The computer storage medium of claim 12, wherein the computer-executable instructions, upon execution by the processor, further causes the processor to at least:
receive a custom artifact type definition and a custom search type definition that includes a reference to an artifact type identifier associated with the custom artifact type definition;
integrate the received custom artifact type definition with the plurality of artifact type definitions; and
integrate the received custom search type definition into an intent-to-search type map;
wherein the plurality of sets of artifact sections of the transcript includes a set of custom artifact sections specified by the integrated custom artifact type definition;
wherein generating the set of section indexes from the transcript based on the plurality of artifact type definitions includes generating a custom section index based on the integrated custom artifact type definition, wherein the generated custom section index is associated with the set of custom artifact sections specified by the integrated custom artifact type definition; and
wherein selecting the section index includes selecting the generated custom section index based on the integrated custom artifact type definition.

17. The computer storage medium of claim 12, wherein the computer-executable instructions, upon execution by the processor, further causes the processor to at least:
obtain related data from other sources associated with the transcript, the related data including at least one of the following: data from a transcript related to the transcript, data from an email related to the transcript, data from a chat history related to the transcript, and data from a document related to the transcript; and
wherein the plurality of sets of artifact sections includes an artifact section of the obtained related data from other sources.

18. The computer storage medium of claim 12, wherein selecting the section index based on the obtained query metadata comprises selecting the section index based on intent data that is indicative of an intent of the analyzed natural language query.

19. The computer storage medium of claim 12, wherein selecting the section index based on the obtained query metadata comprises mapping intent data of the query metadata to a search type definition using an intent-to-search type map, wherein the intent data is indicative of an intent of the analyzed natural language query.

20. The computer storage medium of claim 12, wherein searching the selected section index based on the obtained query metadata comprises searching the selected section index based on entity data and a search schema.

* * * * *